US012788041B2

(12) United States Patent
Browne et al.

(10) Patent No.: US 12,788,041 B2
(45) **Date of Patent: *Nov. 10, 2026**

(54) SWEETENING COMPOSITIONS

(71) Applicant: PepsiCo, Inc., Purchase, NY (US)

(72) Inventors: Damian Browne, Old Greenwich, CT (US); Yuan Fang, Courtlandt Manor, NY (US); Naijie Zhang, Ridgefield, CT (US)

(73) Assignee: PepsiCo, Inc., Purchase, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 18/644,875

(22) Filed: Apr. 24, 2024

(65) Prior Publication Data

US 2025/0017246 A1 Jan. 16, 2025

Related U.S. Application Data

(63) Continuation of application No. 18/319,067, filed on May 17, 2023, now Pat. No. 11,998,033, which is a continuation of application No. 17/728,690, filed on Apr. 25, 2022, now abandoned, which is a continuation of application No. 15/761,389, filed as application No. PCT/US2017/045553 on Aug. 4, 2017, now abandoned.

(60) Provisional application No. 62/377,168, filed on Aug. 19, 2016, provisional application No. 62/370,799, filed on Aug. 4, 2016.

(51) Int. Cl.

| | |
|---|---|
| ***A23L 27/30*** | (2016.01) |
| ***A23L 2/385*** | (2006.01) |
| ***A23L 2/60*** | (2006.01) |

(52) U.S. Cl.

CPC ............... *A23L 27/36* (2016.08); *A23L 2/385* (2013.01); *A23L 2/60* (2013.01); *A23V 2002/00* (2013.01)

(58) Field of Classification Search

CPC . A23L 27/36; A23L 2/385; A23L 2/60; A32L 2/60

See application file for complete search history.

(56) References Cited

U.S. PATENT DOCUMENTS

| | | | |
|---|---|---|---|
| 8,277,861 | B2 | 10/2012 | Chang et al. |
| 9,029,426 | B2 | 5/2015 | Markosyan et al. |
| 2008/0226770 | A1 | 9/2008 | Lee et al. |
| 2008/0226796 | A1 | 9/2008 | Lee et al. |
| 2008/0226802 | A1 | 9/2008 | Lee |
| 2011/0033525 | A1 | 2/2011 | Liu |
| 2011/0189360 | A1 | 8/2011 | Yoo et al. |
| 2012/0121696 | A1 | 5/2012 | Liu |
| 2013/0209658 | A1 | 8/2013 | Spelman et al. |
| 2013/0236629 | A1 | 9/2013 | Walton et al. |
| 2013/0251881 | A1 | 9/2013 | Mutilangi et al. |
| 2014/0171520 | A1 | 6/2014 | Markosyan et al. |
| 2015/0017284 | A1 | 1/2015 | Prakash et al. |
| 2015/0050410 | A1 | 2/2015 | Luo et al. |
| 2015/0141632 | A1 | 5/2015 | Markosyan |
| 2015/0237898 | A1 | 8/2015 | Carlson et al. |
| 2015/0289548 | A1 | 10/2015 | Given et al. |
| 2015/0366253 | A1 | 12/2015 | Shi et al. |
| 2016/0113316 | A1 | 4/2016 | Nachbagauer et al. |

FOREIGN PATENT DOCUMENTS

| | | | |
|---|---|---|---|
| CN | 102894325 | A | 1/2013 |
| CN | 104203006 | A | 12/2014 |
| CN | 104270963 | A | 1/2015 |
| CN | 105407739 | A | 3/2016 |
| EP | 2433505 | A1 | 3/2012 |
| JP | 2012504552 | A | 2/2012 |
| JP | 2015511498 | A | 4/2015 |
| JP | 2016521974 | A | 7/2016 |
| RU | 2008151079 | A | 6/2010 |
| RU | 2008151076 | A | 10/2010 |
| RU | 2429717 | C2 | 9/2011 |
| RU | 2014134743 | A | 4/2016 |
| WO | WO-2010038911 | A1 | 4/2010 |
| WO | WO-2013019963 | A2 | 2/2013 |
| WO | WO-2013036366 | A1 | 3/2013 |
| WO | WO-2013066490 | A1 | 5/2013 |
| WO | WO-2013148177 | A1 | 10/2013 |
| WO | WO-2014186084 | A1 | 11/2014 |
| WO | WO-2015014958 | A1 | 2/2015 |
| WO | WO-2017120480 | A1 | 7/2017 |

OTHER PUBLICATIONS

Upreti, M., et al., "Solubility Enhancement of Steviol Glycosides and Characterization of Their Inclusion Complexes with Gamma-Cyclodextrin," Int J Mol Sci 12(11):7529-7553, MDPI, Switzerland (2011).

International Search Report and Written Opinion for International Application No. PCT/US2017/045553, United States Patent and Trademark Office, Alexandria, Virginia, USA, mailed Nov. 21, 2017, 18 pages.

Pang, S., et al., "Investigation of the solubility enhancement mechanism of rebaudioside D using a solid dispersion technique with potassium sorbate as a carrier," Food Chemistry 174:564-570 (May 2015).

*Primary Examiner* — Jeffrey P Mornhinweg

(74) *Attorney, Agent, or Firm* — Sterne, Kessler, Goldstein & Fox P.L.L.C.

(57) ABSTRACT

This disclosure provides aqueous steviol glycoside compositions as well as syrups and beverages comprising these compositions. In certain embodiments, the aqueous steviol glycoside composition comprises water and a sweetening composition, wherein the sweetening composition is solubilized in the water and comprises a stevioside composition and rebaudioside D.

18 Claims, 10 Drawing Sheets

Stevioside

SWEETENING COMPOSITIONS

FIELD OF DISCLOSURE

This disclosure is directed to novel sweetening compositions comprising a stevioside composition and rebaudioside D.

BACKGROUND

Steviol glycosides, including the rebaudiosides, show promise as mid, low, and zero-calorie sweeteners suitable for use in beverages. Rebaudioside A, for example, is currently marketed in commercially available cola products. Despite having significantly reduced calorie content, beverages comprising rebaudioside A have not been well received in the marketplace due to off-tastes including bitterness, astringency, lingering, licorice flavor, and metallic taste. Food and beverage manufacturers have attempted to compensate for rebaudioside A's flavor profile by blending it with other steviol glycosides, such as rebaudioside D.

Rebaudioside D has a better sugar character and taste profile than rebaudioside A making it a good candidate for combination with rebaudioside A. That said, only about 300 to 450 ppm Rebaudioside D can be solubilized in water at 23° C. and only after stirring for an extended period of time. This low solubility makes it difficult to prepare beverage concentrates and beverages having a rebaudioside D concentration sufficiently high to provide the desired sweetness or other organoleptic properties required to make a beverage acceptable to consumers.

Although some strategies to solubilize rebaudioside D have been disclosed in the art, commercially acceptable solutions to enhance rebaudioside D solubility have been difficult to identify.

SUMMARY

This disclosure is directed to novel sweetening compositions comprising a stevioside composition and rebaudioside D.

The sweetening compositions described herein can be in various forms, including solid forms, including, but not limited to, granules or powders, and liquid forms, including, but not limited to, concentrates, syrups, and beverages. The sweetening compositions can be used in various products, including beverage products, such as ready-to-drink beverages or beverage concentrates, and food products, such as oatmeal, cereal, and snack foods. In certain embodiments, the sweetening compositions can be added in liquid or solid form, or in both forms, to food or beverage products and can be used in any food or beverage product typically including a sweetener.

In one embodiment, this disclosure provides a stevioside/rebaudioside D complex.

In some embodiments, the stevioside and the rebaudioside D are present in the complex at a ratio of from about 1:1 to about 12:1 by weight.

In other embodiments, the stevioside and the rebaudioside D are present in the complex at a ratio of from about 2:1 to about 7:1 by weight.

In other embodiments, the stevioside and the rebaudioside D are present in the complex at a ratio of about 2:1, about 3:1, about 5:1 or about 6:1 by weight.

In one embodiment, this disclosure provides an aqueous steviol glycoside composition comprising water and a sweetening composition comprising rebaudioside D and a stevioside composition, wherein the sweetening composition is solubilized in the water.

In some embodiments, the rebaudioside D is present at from about 0.02 weight percent to about 3.0 weight percent of the aqueous steviol glycoside composition.

In some embodiments, the rebaudioside D is present at from about 0.5 weight percent to about 1.5 weight percent of the aqueous steviol glycoside composition.

In some embodiments, the rebaudioside D is present at from about 1 weight percent to about 1.5 weight percent of the aqueous steviol glycoside composition.

In still further embodiments, the rebaudioside D is about 1.3 weight percent, about 1.4 weight percent, or about 1.5 weight percent of the aqueous steviol glycoside composition.

In some embodiments, the stevioside composition and the rebaudioside D are present in a ratio of from about 1:1 to about 12:1 by weight.

In some embodiments, the stevioside composition and the rebaudioside D are present in a ratio of from about 1:1 to about 10:1 by weight.

In other embodiments, the stevioside composition and the rebaudioside D are present in a ratio of from about 2:1 to about 7:1 by weight.

In some embodiments, the stevioside composition and the rebaudioside D are present in a ratio of about 2:1, about 3:1, about 5:1 or about 6:1 by weight.

In some embodiments, the stevioside composition comprises stevioside and a second steviol glycoside.

In certain embodiments, the second steviol glycoside is selected from the group consisting of rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside O, steviolbioside, rubusoside, and dulcoside A.

In some embodiments, the second steviol glycoside is rebaudioside A, rebaudioside B, rebaudioside C, or rebaudioside M.

In still further embodiments, the second steviol glycoside is rebaudioside A.

In some embodiments, the aqueous steviol glycoside composition is completely or substantially free of rebaudioside B.

In some embodiments, the stevioside and rebaudioside A are present in a ratio of from 20:1 to 1:99.

In some embodiments, the stevioside and rebaudioside A are present in a ratio of from less than 95:5 to 1:99 by weight.

In other embodiments, the stevioside and rebaudioside A are present in a ratio of from about 1:1 to about 2:98 by weight.

In some embodiments, the rebaudioside A comprises about 50 weight percent of the stevioside composition, about 55 weight percent of the stevioside composition, about 60 weight percent of the stevioside composition, about 65 weight percent of the stevioside composition, about 70 weight percent of the stevioside composition, about 75 weight percent of the stevioside composition, about 80 weight percent of the stevioside composition, about 85 weight percent of the stevioside composition, about 90 weight percent of the stevioside composition, about 95 weight percent of the stevioside composition, about 96 weight percent of the stevioside composition, about 97 weight percent of the stevioside composition, or about 98 weight percent of the stevioside composition.

In some embodiments, the second steviol glycoside is rebaudioside C.

In some embodiments, the stevioside and rebaudioside C are present in a ratio of from 20:1 to 1:99 by weight.

In some embodiments, the stevioside and rebaudioside C are present in a ratio of from less than 95:5 to 1:99 by weight.

In other embodiments, the stevioside and rebaudioside C are present in a ratio of from about 1:1 to about 2:98 by weight.

In some embodiments, the second steviol glycoside is rebaudioside M.

In some embodiments, the stevioside and rebaudioside M are present in a ratio of from 20:1 to 1:99 by weight.

In some embodiments, the stevioside and rebaudioside M are present in a ratio of from less than 95:5 to 1:99 by weight.

In other embodiments, the stevioside and rebaudioside M are present in a ratio of from about 1:1 to about 2:98 by weight.

In some embodiments, the second steviol glycoside is rebaudioside B.

In some embodiments, the stevioside and rebaudioside B are present in a ratio of from 20:1 to 8:1 by weight.

In some embodiments, the stevioside and rebaudioside B are present in a ratio of from less than 95:5 to 8:1 by weight.

In some embodiments, the sweetening composition further comprises from about 0.01 weight percent to about 10 weight percent of a mixture of other steviol glycosides.

In some embodiments, the mixture of other steviol glycosides comprises at least one steviol glycoside selected from the group consisting of rebaudioside A, rebaudioside B, rebaudioside C, rebaudioside E, rebaudioside F, rebaudioside G, rebaudioside H, rebaudioside I, rebaudioside J, rebaudioside K, rebaudioside L, rebaudioside M, rebaudioside O, steviolbioside, rubusoside, and dulcoside A.

In other embodiments, this disclosure provides a zero- or low-calorie beverage, the zero- or low-calorie beverage comprising from about 3 to about 7 parts of water, by volume, and 1 part, by volume, of a syrup comprising about 1 part, by volume, of an aqueous steviol glycoside composition, the aqueous steviol glycoside composition comprising a second amount of water and a sweetening composition comprising rebaudioside D and a stevioside composition, wherein the sweetening composition is solubilized in the second amount of water.

In some embodiments of the beverage, the rebaudioside D is present at from about 0.02 weight percent to about 3.0 weight percent of the aqueous steviol glycoside composition.

In some embodiments of the beverage, the rebaudioside D is present at from about 0.5 weight percent to about 1.5 weight percent of the aqueous steviol glycoside composition.

In other embodiments of the beverage, the rebaudioside D is present at from about 1 weight percent to about 1.5 weight percent of the aqueous steviol glycoside composition.

In another beverage embodiment, the rebaudioside D is about 1.3 weight percent, about 1.4 weight percent, or about 1.5 weight percent of the aqueous steviol glycoside composition.

In another beverage embodiment, the stevioside composition and the rebaudioside D are present in a ratio of from about 1:1 to about 12:1 by weight.

In yet another beverage embodiment, the stevioside composition and the rebaudioside D are present in a ratio of from about 1:1 to about 10:1 by weight.

In certain beverage embodiments, the stevioside composition and the rebaudioside D are present in a ratio of from about 2:1 to about 7:1 by weight.

In other beverage embodiments, the stevioside composition and the rebaudioside D are present in a ratio of about 2:1, about 3:1, about 5:1, or about 6:1 by weight.

In certain beverage embodiments, the stevioside composition comprises stevioside and a second steviol glycoside.

In some beverage embodiments, the second steviol glycoside is selected from the group consisting of rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside O, steviolbioside, rubusoside, and dulcoside A.

In some beverage embodiments, the second steviol glycoside is rebaudioside A or rebaudioside M.

In still other beverage embodiments, the second steviol glycoside is rebaudioside A.

In some beverage embodiments, the stevioside and rebaudioside A are present in a ratio of from less than 20:1 to 1:99 by weight.

In other beverage embodiments, the stevioside and rebaudioside A are present in a ratio of from about 1:1 to about 2:98 by weight.

In other beverage embodiments, the rebaudioside A comprises about 50 weight percent of the stevioside composition, about 55 weight percent of the stevioside composition, about 60 weight percent of the stevioside composition, about 65 weight percent of the stevioside composition, about 70 weight percent of the stevioside composition, about 75 weight percent of the stevioside composition, about 80 weight percent of the stevioside composition, about 85 weight percent of the stevioside composition, about 90 weight percent of the stevioside composition, about 95 weight percent of the stevioside composition, about 96 weight percent of the stevioside composition, about 97 weight percent of the stevioside composition, or about 98 weight percent of the stevioside composition.

In some beverage embodiments, the sweetening composition further comprises from about 0.01 weight percent to about 10 weight percent of a mixture of other steviol glycosides.

In some beverage embodiments, the mixture of other steviol glycosides comprises at least one steviol glycoside selected from the group consisting of rebaudioside C, rebaudioside E, rebaudioside F, rebaudioside G, rebaudioside H, rebaudioside I, rebaudioside J, rebaudioside K, rebaudioside L, rebaudioside M, rebaudioside O, steviolbioside, rubusoside, and dulcoside A.

This disclosure further includes a syrup comprising a first amount of water and at least one part, by volume, of an aqueous steviol glycoside composition comprising a second amount of water; and a sweetening composition comprising rebaudioside D and a stevioside composition, wherein the sweetening composition is solubilized in the second amount of water.

This disclosure also provides a syrup or beverage preparation kit, the kit comprising the aqueous steviol glycoside composition described herein and instructions for preparing a syrup or beverage directly from the aqueous steviol glycoside composition.

In some embodiments, the beverage preparation kit comprises the syrup described herein and instructions for preparing a beverage from the syrup.

This disclosure provides a method of preparing the aqueous steviol glycoside composition described herein. In certain embodiments, the method comprises preparing an aqueous rebaudioside D suspension and adding a stevioside composition to the aqueous rebaudioside D suspension under shear.

In certain embodiments of the method, the aqueous rebaudioside D suspension is prepared by suspending rebaudioside D in water having a temperature ranging from 18° C. up to about 75° C.

In other embodiments of the method, the aqueous rebaudioside D suspension is prepared by suspending rebaudioside D in water having a temperature of about 70° C.

In other embodiments of the method, the aqueous rebaudioside D suspension is prepared by suspending rebaudioside D in water having a temperature ranging from 30° C. up to about 65° C.

In another method of preparing the aqueous steviol glycoside composition, the method comprises adding the sweetening composition to water under shear.

In certain embodiments of the method, the water has a temperature ranging from 18° C. up to about 75° C.

In other embodiments of the method, the water has a temperature of about 70° C.

In other embodiments of the method, the water has a temperature ranging from 30° C. up to about 65° C.

This disclosure further provides a method of preparing the syrup described herein comprising combining at least one part, by volume, of an aqueous steviol glycoside composition with a diluent, wherein the aqueous steviol glycoside composition comprises a second amount of water; and a sweetening composition comprising rebaudioside D and a stevioside composition, further wherein the sweetening composition is solubilized in the second amount of water and wherein the syrup has a rebaudioside D concentration of from about 180 ppm to about 900 ppm.

In certain embodiments, the beverage disclosed herein has a rebaudioside D concentration of from about 30 ppm to about 90 ppm.

In certain embodiments, the beverage disclosed herein has a rebaudioside D concentration of from about 30 to about 75 ppm.

In certain embodiments, the syrup disclosed herein rebaudioside D concentration of from about 150 ppm to 1000 ppm.

In certain embodiments, the syrup disclosed herein has a rebaudioside D concentration of from about 180 ppm to about 450 ppm.

This disclosure further provides a kit comprising one or more pods, cartridges, or other containers adapted to store a sufficient quantity of the syrup described herein for preparing a single- or multiple-serve beverage and, optionally, a beverage-dispensing apparatus adapted to receive the one or more pods or cartridges, wherein, upon activation by a user, the beverage dispensing apparatus combines the contents of one pod or cartridge with an appropriate volume of optionally carbonated water, or other diluent, to provide a single- or multiple-serve beverage.

In certain embodiments, the kit further comprises instructions for operating the beverage-dispensing apparatus, cleaning the apparatus, and refilling and/or recycling spent pods or cartridges.

In some embodiments, the aqueous steviol glycoside composition comprises water and a stevioside/rebaudioside D complex.

In some embodiments, the rebaudioside D is present in the aqueous steviol glycoside composition at a concentration ranging from about 0.2 weight percent to about 3 weight percent.

In some embodiments, the rebaudioside D is present in the aqueous steviol glycoside composition at a concentration ranging from about 0.5 weight percent to about 1.5 weight percent.

In some embodiments, the rebaudioside D is present in the aqueous steviol glycoside composition at a concentration ranging from about 1 weight percent to about 1.5 weight percent.

In some embodiments, the rebaudioside D is present in the aqueous steviol glycoside composition at a concentration of about 1.3 weight percent, about 1.4 weight percent, or about 1.5 weight percent.

In some embodiments, the aqueous steviol glycoside composition further comprises a steviol glycoside other than rebaudioside D or stevioside.

In some embodiments, the steviol glycoside other than rebaudioside D or stevioside is selected from the group consisting of rebaudioside A, rebaudioside B, rebaudioside C, rebaudioside E, rebaudioside F, rebaudioside G, rebaudioside H, rebaudioside I, rebaudioside J, rebaudioside K, rebaudioside L, rebaudioside M, rebaudioside O, steviolbioside, rubusoside, and dulcoside A.

In some embodiments, the stevioside/rebaudioside D complex is prepared by a method comprising combining stevioside and rebaudioside D in water to form a mixture, and heating the mixture. In some embodiments, the mixture is heated to a temperature ranging from about 18° C. to about 75° C.

This disclosure also provides a syrup comprising water and a stevioside/rebaudioside D complex.

In some embodiments, the stevioside and rebaudioside D are present in the syrup at a ratio from about 1:1 to about 12:1 by weight.

In other embodiments, the stevioside and the rebaudioside D are present in the syrup at a ratio of from about 2:1 to about 7:1 by weight.

In other embodiments, the stevioside and the rebaudioside D are present in the syrup at a ratio of about 2:1, about 3:1, about 5:1 or about 6:1 by weight.

In some embodiments, the syrup further comprises a steviol glycoside other than rebaudioside D or stevioside.

In some embodiments, the steviol glycoside other than rebaudioside D or stevioside is selected from the group consisting of rebaudioside A, rebaudioside B, rebaudioside C, rebaudioside E, rebaudioside F, rebaudioside G, rebaudioside H, rebaudioside I, rebaudioside J, rebaudioside K, rebaudioside L, rebaudioside M, rebaudioside O, steviolbioside, rubusoside, and dulcoside A.

In other embodiments, this disclosure provides a beverage comprising water and a stevioside/rebaudioside D complex.

In some embodiments, the stevioside and rebaudioside D are present in the beverage at a ratio from about 1:1 to about 12:1 by weight.

In other embodiments, the stevioside and the rebaudioside D are present in the beverage at a ratio of from about 2:1 to about 7:1 by weight.

In other embodiments, the stevioside and the rebaudioside D are present in the beverage at a ratio of about 2:1, about 3:1, about 5:1 or about 6:1 by weight.

In some embodiments, the beverage further comprises a steviol glycoside other than rebaudioside D or stevioside.

In some embodiments, the steviol glycoside other than rebaudioside D or stevioside is selected from the group consisting of rebaudioside A, rebaudioside B, rebaudioside C, rebaudioside E, rebaudioside F, rebaudioside G, rebaudioside H, rebaudioside I, rebaudioside J, rebaudioside K, rebaudioside L, rebaudioside M, rebaudioside O, steviolbioside, rubusoside, and dulcoside A.

BRIEF DESCRIPTION OF THE DRAWINGS

The foregoing summary, as well as the following detailed description of the embodiments, will be better understood when read in conjunction with the appended figures. For the purpose of illustration, the figures may describe the use of specific embodiments. It should be understood, however, that the compositions and compositions described herein are not limited to the precise embodiments discussed or described in the figures.

DETAILED DESCRIPTION

Figure 1:
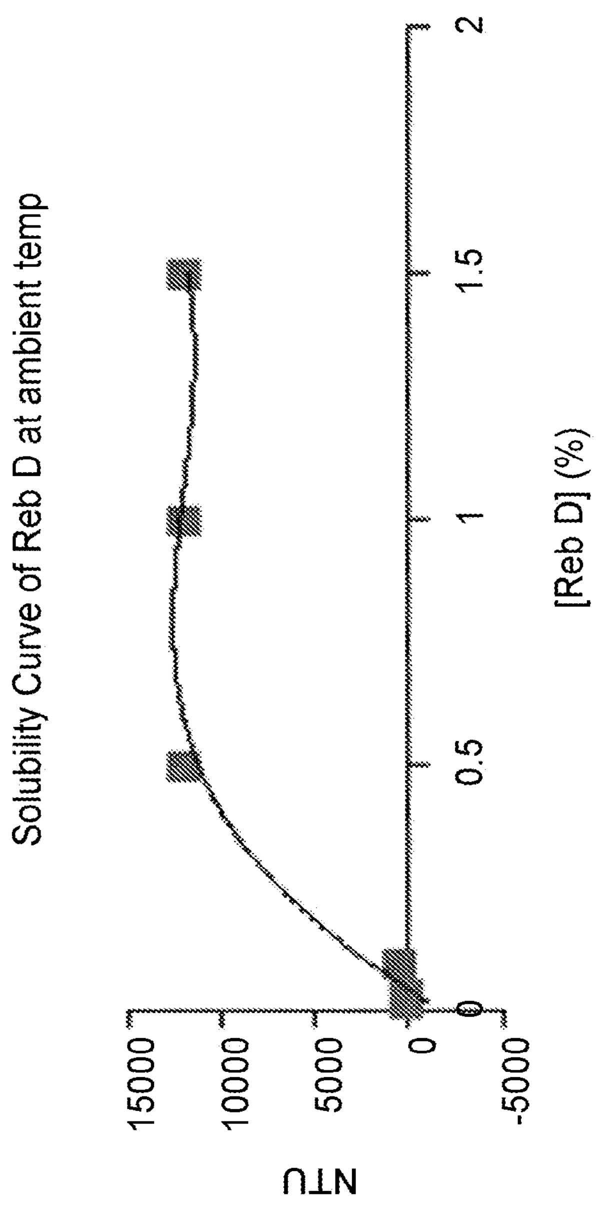
FIG. 1 is a graph depicting the increasing insolubility of increasing concentrations of rebaudioside D in water at ambient temperature. Insolubility was assessed by measuring turbidity (NTU), with maximum turbidity at around 10,000 to 12,000 NTUs indicating that no light was capable of passing through a given sample.

Rebaudioside D has a better sugar character and taste profile than Rebaudioside A, but only about 200 ppm Rebaudioside D can be solubilized in water at 23° C. after about 30 minutes stirring. While up to about 450 ppm rebaudioside can be solubilized after extended stirring, the amount of time required to prepare these higher concentration rebaudioside D solutions is impractical on a commercial scale. Similarly, while an 8000 ppm aqueous rebaudioside D solution can be prepared by heating rebaudioside D in water to nearly 100° C. for two hours, cooling the solution results in recrystallization, making the solution impractical to work with on a commercial manufacturing scale.

It has now, however, been surprisingly discovered that high purity rebaudioside D can be combined with stevioside in the varying ratios described herein in an aqueous solution, at room or elevated temperature, to produce solubilized steviol glycoside solutions. These solutions have Rebaudioside D concentrations significantly greater than would be otherwise possible in the absence of stevioside and can be prepared in reasonable timeframes and at temperatures that can be practiced in a commercial setting.

For example, in certain embodiments, rebaudioside D solubility can be increased 50 fold, for example, from about 200 ppm (0.02 weight percent) up to about 10,000 ppm (1 weight percent), when a 1 weight percent rebaudioside D suspension is combined with sufficient stevioside to produce a 50,000 ppm (5 weight percent) steviol glycoside solution. In other embodiments, even greater increases in rebaudioside D solubility can be observed. For example, rebaudioside D solubility can be increased 75 fold, for example, from about 200 ppm (0.02 weight percent) up to about 15,000 ppm (1.5 weight percent), when a 1.5 weight percent rebaudioside D suspension is combined with sufficient stevioside to produce a 75,000 ppm (7.5 weight percent) steviol glycoside solution. Rebaudioside D solubility can be further increased 125 fold, for example, from about 200 ppm (0.02 weight percent) up to about 25,000 ppm (2.5 weight percent), when a 2.5 weight percent rebaudioside D suspension is combined with sufficient stevioside to produce a 325,000 ppm (32.5 weight percent) steviol glycoside solution.

Interestingly, the synergistic relationship between stevioside and rebaudioside D appears to be unique, with no other steviol glycoside or combinations of glycosides providing complete dissolution, as measured by turbidity and/or HPLC, of rebaudioside D within the currently described ratios. It is believed that stevioside disrupts rebaudioside D's crystal structure via complexation, thereby lowering the amount of energy required to dissolve a given amount of rebaudioside D in an aqueous solution.

The stevioside/rebaudioside D complex can be observed using techniques known in the art, including, but not limited to, Nuclear Magnetic Resonance spectroscopy (NMR), Fourier Transform Infrared spectroscopy (FTIR), and surface activity measurements. For example, the presence of a stevioside/rebaudioside D complex can be detected by observing chemical shift changes in one or more of stevioside's carbons versus uncomplexed stevioside using $^{13}C$ NMR.

Stevioside is the most abundant component in Stevia rebaudiana extract. While it's flavor profile is less preferred compared to rebaudiosides A and D, it has been further surprisingly discovered that within the ratios described herein, the non-preferred taste characteristics of stevioside can be masked by at least rebaudioside D. It has also been surprisingly discovered that steviol glycoside compositions comprising rebaudioside D and stevioside exhibit improved taste profiles as compared to compositions containing rebaudioside A as the only steviol glycoside.

Definitions

The articles "a," "an," and "the" are used herein to refer to one or to more than one (i.e., to at least one) of the grammatical object of the article. By way of example, "an element" means one element or more than one element.

As used herein, the term "about" means±10% of the noted value. By way of example only, a composition comprising "about 30 weight percent" of a compound could include from 27 weight percent of the compound up to and including 33 weight percent of the compound.

As used herein, "taste" refers to a combination of sweetness perception, temporal effects of sweetness perception, i.e., on-set and duration, off-tastes, such as bitterness and metallic taste, residual perception (aftertaste), and tactile perception, such as body and thickness.

The term "nutritive sweetener" refers generally to sweeteners which provide significant caloric content in typical usage amounts, such as more than about 5 calories per 8 oz. serving of a beverage.

As used herein, the term "non-nutritive sweetener" refers to all sweeteners other than nutritive sweeteners.

The phrase "NTU" as used herein refers to Nephelometric Turbidity Units. For a given sample, turbidity in NTUs can be measured at 20±2° C. using a Hach 2100AN Turbidimeter. The instrument can be calibrated using a STABLCAL Calibration Kit including samples having turbidities ranging from 0.1 NTU to 7500 NTU. Test samples can be measured in a Turbidimeter glass vial and NTU values can be read after a 30 second stabilization period.

In one embodiment, this disclosure provides an aqueous steviol glycoside composition comprising water and a sweetening composition, wherein the sweetening composition is solubilized in the water and wherein the sweetening composition comprises a stevioside composition and rebaudioside D. The stevioside composition comprises stevioside and optionally one or more additional steviol glycosides.

In some embodiments, the rebaudioside D can be complexed with at least some of the stevioside in the stevioside composition, such that the sweetening composition comprises a stevioside/rebaudioside D complex.

In some embodiments, the stevioside and rebaudioside D can be present in the stevioside/rebaudioside D complex at a ratio of from about 1:1 to about 20:1 by weight, respectively. In other embodiments, the stevioside and rebaudioside D can be present in the stevioside/rebaudioside D complex at a ratio of from about 1:1 to about 15:1 by weight, or from about 1:1 to about 12:1 by weight. In other embodiments, the stevioside and rebaudioside D can be present in the stevioside/rebaudioside D complex at a ratio of from about 1:1 to about 10:1 by weight, or from about 2:1 to about 7:1 by weight. In particular embodiments, the weight to weight ratio of stevioside to rebaudioside D can be about 1:1, about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, 2.7:1, 2.8:1, 2.9:1, about 3:1, about 3.1:1, about 3.2:1, about 3.3:1, about 3.4:1, about 3.5:1, about 3.6:1, about 3.7:1, about 3.8:1, about 3.9:1, about 4:1, about 4.1:1, about 4.2:1, about 4.3:1, about 4.4:1, about 4.5:1, about 4.6:1, about 4.7:1, about 4.8:1, about 4.9:1, about 5:1, about 5.1:1, about 5.2:1, about 5.3:1, about 5.4:1, about 5.5:1, about 5.6:1, about 5.7:1, about 5.8:1, about 5.9:1, about 6:1, about 6.1:1, about 6.2:1, about 6.3:1, about 6.4:1, about 6.5:1, about 6.6:1, about 6.7:1, about 6.8:1, about 6.9:1, about 7:1, about 7.1:1, about 7.2:1, about 7.3:1, about 7.4:1, about 7.5:1, about 7.6:1, about 7.7:1, about 7.8:1, 7.9:1, about 8:1, about 8.1:1, about 8.2:1, about 8.3:1, about 8.4:1, about 8.5:1, about 8.6:1, about 8.7:1, about 8.8:1, about 8.9:1, about 9:1, about 9.1:1, about 9.2:1, about 9.3:1, about 9.4:1, about 9.5:1, about 9.6:1, about 9.7:1, about 9.8:1, about 9.9:1, about 10:1, about 10.1:1, about 10.2:1, about 10.3:1, about 10.4:1, about 10.5:1, about 10.6:1, about 10.7:1, about 10.8:1, about 10.9:1, about 11:1, about 11.1:1, about 11.2:1, about 11.3:1, about 11.4:1, about 11.5:1, about 11.6:1, about 11.7:1, about 11.8:1, about 11.9:1, or about 12:1. In particular embodiments, the weight to weight ratio of stevioside to rebaudioside D can be about 1:1, about 2:1, about 3:1, about 4:1, about 5:1, about 6:1, or about 7:1. In even more specific embodiments, the weight ratio of stevioside to rebaudioside D can be about 4:1 or about 5:1.

In some embodiments, the stevioside/rebaudioside D complex can be prepared by combining stevioside and rebaudioside D in an appropriate amount of water, either at room temperature, i.e. about 18° C. to about 23° C., or at a modestly elevated temperature, such as from about 25° C. up to about 75° C., including, about 30° C., about 35° C., about 40° C. about 45° C., about 50° C., about 55° C., about 60° C., about 65° C., about 70° C., or about ° C. In other embodiments, the stevioside/rebaudioside D complex can be prepared by combining stevioside and rebaudioside D in an appropriate amount of water at from about 30° C. up to about 70° C., or from about 30° C. up to about 65° C. In other embodiments, the stevioside/rebaudioside D complex can be prepared by combining stevioside and rebaudioside D in an appropriate amount of water to form a mixture, and heating the mixture to a temperature ranging from about 18° C. to about 75° C. In other embodiments, the stevioside/rebaudioside D complex can be prepared at at least about 50° C., at least about 60° C., at least about 65° C., at least about 70° C., or at least about 75° C.

Alternatively, the stevioside/rebaudioside D complex can be prepared by suspending a known quantity of rebaudioside D in water either at room temperature, i.e. about 18° C. to about 23° C., or at a modestly elevated temperature, such as from about 25° C. up to about 75° C., or from about 30° C. up to about 70° C., or from about 30° C. up to about 65° C., and subsequently adding a known quantity of stevioside to the suspension. In a further alternative, the stevioside/rebaudioside D complex can be prepared by adding a known quantity of stevioside to an appropriate volume of water either at room temperature, i.e. about 18° C. to about 23° C., or at a modestly elevated temperature, such as from about 25° C. up to about 75° C., or from about 30° C. up to about 70° C., or from about 30° C. up to about 65° C., and subsequently adding an appropriate amount of rebaudioside D.

In some embodiments, the stevioside/rebaudioside D complex can be spray dried to prepare a spray dried stevioside/rebaudioside D complex. In some embodiments, the spray dried stevioside/rebaudioside D complex can be in the form of a powder having particle sizes ranging from about 10 microns to about 300 microns in diameter.

The spray dried stevioside/rebaudioside D complex can be prepared using suitable methods known to those of ordinary skill in the art. For example, in certain embodiments, a Buchi® mini spray dryer can be used to produce the spray dried stevioside/rebaudioside D complex.

The sweetening composition is considered solubilized in the aqueous steviol glycoside composition when, in certain embodiments, the aqueous steviol glycoside composition has a turbidity of less than about 100 NTU. In other embodiments, the sweetening composition is considered solubilized in the aqueous steviol glycoside composition when the aqueous steviol glycoside composition has a turbidity of less than about 90 NTU, less than about 80 NTU, less than about 70 NTU, less than about 60 NTU, less than about 50 NTU, less than about 45 NTU, less than about 40 NTU, less than about 35 NTU, less than about 30 NTU, less than about 25 NTU, less than about 20 NTU, less than about 15 NTU, less than about 14 NTU, less than about 13 NTU, less than about 12 NTU, less than about 11 NTU, less than about 10 NTU, less than about 9 NTU, less than about 8 NTU, less than about 7 NTU, less than about 6 NTU, less than about 5 NTU, less than about 4 NTU, less than about 3 NTU, less than about 2 NTU, or less than about 1 NTU.

In particular embodiments, the sweetening composition is considered solubilized in the aqueous steviol glycoside composition when the aqueous steviol glycoside composition has a turbidity of less than about 100 NTU, less than about 50 NTU, less than about 25 NTU, less than about 10 NTU, or less than about 5 NTU. In particular embodiments, the aqueous steviol glycoside composition can have a turbidity of 25 NTU, 15 NTU, 10 NTU, 5 NTU, or 1 NTU.

In still other embodiments, the sweetening composition is considered solubilized in the aqueous steviol glycoside composition when the aqueous steviol glycoside composition has a turbidity ranging from about 0.1 NTU to about 10 NTU, from about 0.1 NTU to about 50 NTU, or from about 0.1 to about 100 NTU. In certain embodiments, the sweetening composition is considered solubilized in the aqueous steviol glycoside composition when the aqueous steviol glycoside composition has a turbidity ranging from about 50 NTU to about 100 NTU, from about 25 NTU to about 50 NTU, from about 0.1 NTU to about 25 NTU, or from about 0.1 NTU to about 10 NTU.

It is within the skill of the ordinarily skilled artisan armed with this disclosure to prepare aqueous steviol glycoside compositions having turbidities discussed above. In particular, turbidity can be adjusted by attenuating rebaudioside D solubility in the aqueous steviol glycoside composition by changing the ratio of rebaudioside D to the stevioside composition and/or varying the absolute amounts of rebaudioside D and/or stevioside.

The stevioside composition and rebaudioside D can be present in the sweetening composition at a ratio of from about 1:1 to about 20:1 by weight, respectively. In other embodiments, the stevioside composition and rebaudioside D can be present in the sweetening composition at a ratio of from about 1:1 to about 15:1 by weight, or from about 1:1 to about 12:1 by weight. In other embodiments, the stevioside composition and rebaudioside D can be present in the sweetening composition at a ratio of from about 1:1 to about 10:1 by weight, or from about 2:1 to about 7:1 by weight. In particular embodiments, the weight to weight ratio of the stevioside composition to rebaudioside D can be about 1:1, about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, 2.7:1, 2.8:1, 2.9:1, about 3:1, about 3.1:1, about 3.2:1, about 3.3:1, about 3.4:1, about 3.5:1, about 3.6:1, about 3.7:1, about 3.8:1, about 3.9:1, about 4:1, about 4.1:1, about 4.2:1, about 4.3:1, about 4.4:1, about 4.5:1, about 4.6:1, about 4.7:1, about 4.8:1, about 4.9:1, about 5:1, about 5.1:1, about 5.2:1, about 5.3:1, about 5.4:1, about 5.5:1, about 5.6:1, about 5.7:1, about 5.8:1, about 5.9:1, about 6:1, about 6.1:1, about 6.2:1, about 6.3:1, about 6.4:1, about 6.5:1, about 6.6:1, about 6.7:1, about 6.8:1, about 6.9:1, about 7:1, about 7.1:1, about 7.2:1, about 7.3:1, about 7.4:1, about 7.5:1, about 7.6:1, about 7.7:1, about 7.8:1, 7.9:1, about 8:1, about 8.1:1, about 8.2:1, about 8.3:1, about 8.4:1, about 8.5:1, about 8.6:1, about 8.7:1, about 8.8:1, about 8.9:1, about 9:1, about 9.1:1, about 9.2:1, about 9.3:1, about 9.4:1, about 9.5:1, about 9.6:1, about 9.7:1, about 9.8:1, about 9.9:1, about 10:1, about 10.1:1, about 10.2:1, about 10.3:1, about 10.4:1, about 10.5:1, about 10.6:1, about 10.7:1, about 10.8:1, about 10.9:1, about 11:1, about 11.1:1, about 11.2:1, about 11.3:1, about 11.4:1, about 11.5:1, about 11.6:1, about 11.7:1, about 11.8:1, about 11.9:1, or about 12:1. In particular embodiments, the weight to weight ratio of the stevioside composition to rebaudioside D can be about 1:1, about 2:1, about 3:1, about 4:1, about 5:1, about 6:1, or about 7:1. In even more specific embodiments, the weight ratio of the stevioside composition to rebaudioside D can be about 4:1 or about 5:1.

The stevioside composition can be mixture of stevioside and a second steviol glycoside. In some embodiments, the second steviol glycoside can be selected from the group consisting of rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside O, steviolbioside, rubusoside, and dulcoside A. In particular embodiments, the second steviol glycoside can be rebaudioside A, rebaudioside B, rebaudioside C, or rebaudioside M. As discussed above, and in certain embodiments, at least some of the stevioside in the stevioside composition can be complexed with the rebaudioside D.

In some embodiments, the stevioside and the second steviol glycoside can be present in the stevioside composition in a weight ratio, on a dry basis, of stevioside to second steviol glycoside of from 20:1 to 1:99. In other embodiments, the stevioside and the second steviol glycoside can be present in the stevioside composition in a weight ratio, on a dry basis, of stevioside to second steviol glycoside of from less than 95:5 to 1:99. In particular embodiments, the weight ratio of stevioside to the second steviol glycoside, on a dry basis, ranges from about 1:1 to about 2:98. In still further embodiments, the second steviol glycoside can comprise about 50 weight percent of the stevioside composition, about 55 weight percent of the stevioside composition, about 60 weight percent of the stevioside composition, about 65 weight percent of the stevioside composition, about 70 weight percent of the stevioside composition, about 75 weight percent of the stevioside composition, about 80 weight percent of the stevioside composition, about 85 weight percent of the stevioside composition, about 90 weight percent of the stevioside composition, about 95 weight percent of the stevioside composition, about 96 weight percent of the stevioside composition, about 97 weight percent of the stevioside composition, or about 98 weight percent of the stevioside composition.

In specific embodiments, the second steviol glycoside can be rebaudioside A. In certain embodiments, the stevioside and rebaudioside A can be present in the stevioside composition in a weight ratio of stevioside to rebaudioside A of 20:1 to 1:99 by weight. In other embodiments, the stevioside and rebaudioside A can be present in the stevioside composition in a weight ratio of stevioside to rebaudioside A of from less than 95:5 to 1:99 by weight. In particular embodiments, the weight ratio of stevioside to rebaudioside A ranges from about 1:1 to about 2:98 by weight. In still further embodiments, the rebaudioside A can comprise about 50 weight percent of the stevioside composition, about 55 weight percent of the stevioside composition, about 60 weight percent of the stevioside composition, about 65 weight percent of the stevioside composition, about 70 weight percent of the stevioside composition, about 75 weight percent of the stevioside composition, about 80 weight percent of the stevioside composition, about 85 weight percent of the stevioside composition, about 90 weight percent of the stevioside composition, about 95 weight percent of the stevioside composition, about 96 weight percent of the stevioside composition, about 97 weight percent of the stevioside composition, or about 98 weight percent of the composition.

In other embodiments, the second steviol glycoside can be rebaudioside B. In certain embodiments, the stevioside and rebaudioside B can be present in the stevioside composition in a weight ratio of stevioside to rebaudioside B of 20:1 to 8:1 by weight. In other embodiments, the stevioside and rebaudioside B can be present in the stevioside composition in a weight ratio of stevioside to rebaudioside B of from less than 95:5 to 8:1 by weight. In further embodiments, the rebaudioside B can comprise about 1 weight percent of the stevioside composition, about 2 weight percent of the stevioside composition, about 3 weight percent of the stevioside composition, about 4 weight percent of the stevioside composition, about 5 weight percent of the stevioside composition, about 6 weight percent of the stevioside composition, about 7 weight percent of the stevioside composition, about 8 weight percent of the stevioside composition, about 9 weight percent of the stevioside composition, about 10 weight percent of the stevioside composition, about 11 weight percent of the stevioside composition, or about 12 weight percent of the composition. Although in certain embodiments the second steviol glycoside can be rebaudioside B, in other embodiments, the second steviol glycoside is not rebaudioside B.

In other embodiments, the second steviol glycoside can be rebaudioside C. In certain embodiments, the stevioside and rebaudioside C can be present in the stevioside composition in a weight ratio of stevioside to rebaudioside C of 20:1 to 1:99 by weight. In other embodiments, the stevioside and rebaudioside C can be present in the stevioside composition in a weight ratio of stevioside to rebaudioside C of from less than 95:5 to 1:99 by weight. In particular embodiments, the weight ratio of stevioside to rebaudioside C ranges from about 1:1 to about 2:98 by weight. In still further embodiments, the rebaudioside C can comprise about 50 weight percent of the stevioside composition, about 55 weight percent of the stevioside composition, about 60 weight percent of the stevioside composition, about 65 weight percent of the stevioside composition, about 70 weight percent of the stevioside composition, about 75 weight percent of the stevioside composition, about 80 weight percent of the stevioside composition, about 85 weight percent of the stevioside composition, about 90 weight percent of the stevioside composition, about 95 weight percent of the stevioside composition, about 96 weight percent of the stevioside composition, about 97 weight percent of the stevioside composition, or about 98 weight percent of the composition.

In other embodiments, the second steviol glycoside can be rebaudioside M. In certain embodiments, the stevioside and rebaudioside M can be present in the stevioside composition in a weight ratio of stevioside to rebaudioside M of 20:1 to 1:99 by weight. In other embodiments, the stevioside and rebaudioside M can be present in the stevioside composition in a weight ratio of stevioside to rebaudioside M of from less than 95:5 to 1:99 by weight. In particular embodiments, the weight ratio of stevioside to rebaudioside M ranges from about 1:1 to about 2:98 by weight. In still further embodiments, the rebaudioside M can comprise about 50 weight percent of the stevioside composition, about 55 weight percent of the stevioside composition, about 60 weight percent of the stevioside composition, about 65 weight percent of the stevioside composition, about 70 weight percent of the stevioside composition, about 75 weight percent of the stevioside composition, about 80 weight percent of the stevioside composition, about 85 weight percent of the stevioside composition, about 90 weight percent of the stevioside composition, about 95 weight percent of the stevioside composition, about 96 weight percent of the stevioside composition, about 97 weight percent of the stevioside composition, or about 98 weight percent of the composition.

The sweetening composition, and as a result, the aqueous steviol glycoside composition, can also contain minor amounts of a mixture of other steviol glycosides such as rebaudioside A, rebaudioside B, rebaudioside C, rebaudioside E, rebaudioside F, rebaudioside G, rebaudioside H, rebaudioside I, rebaudioside J, rebaudioside K, rebaudioside L, rebaudioside M, rebaudioside O, steviolbioside, rubusoside, and dulcoside A. Although rebaudioside B can be present, in certain embodiments, rebaudioside B is completely or substantially absent such that is present at less than 0.2 weight percent or not detectable in the sweetening composition under appropriate HPLC conditions. In some embodiments, rebaudioside B is not detectable in the sweetening composition.

The mixture of other steviol glycosides can be present at from about 0.01 weight percent up to about 10 weight percent of the sweetening composition. Thus, and by way of example only, a sweetening composition comprising about 52 weight percent rebaudioside A, about 24 weight percent stevioside, and about 16 weight percent rebaudioside D, would contain about 8 weight percent of a mixture of other steviol glycosides. Conversely, a sweetening composition comprising about 84 weight percent rebaudioside A, about 1 weight percent stevioside, and 14 weight percent rebaudioside D, would contain about 1 weight percent of a mixture of the mixture of other steviol glycosides.

In certain embodiments, at least 0.1 weight percent up to about 0.5 weight percent rebaudioside C and/or dulcoside A can be present in the sweetening composition.

In certain embodiments, the aqueous steviol glycoside composition can further comprise a salt, such as sodium chloride, potassium chloride, calcium chloride, or other edible salt known in the art. In certain embodiments, the salt can be calcium chloride. In other embodiments, the salt can be completely or substantially absent.

In some embodiments, the sweetening composition described herein can be in a liquid form, such as a concentrate or syrup.

In other embodiments, the sweetening composition described herein can be in solid form, such as granules or powders. In other embodiments, the sweetening composition can be in a solid form for use as a tabletop sweetener. In further embodiments, the sweetening compositions can be in the form of a spray dried powder.

Aqueous Steviol Glycoside Compositions

As discussed above, the aqueous steviol glycoside composition comprises water and the sweetening composition, wherein the sweetening composition is solubilized in the water and wherein the sweetening composition comprises a stevioside composition and rebaudioside D, and further wherein, in at least some embodiments, at least some of the stevioside in the stevioside composition can be complexed with the rebaudioside D, such that the sweetening composition can comprise a stevioside/rebaudioside D complex. Various sweetening compositions are described above.

In certain embodiments, the aqueous steviol glycoside composition can have a rebaudioside D concentration ranging from greater than 0.02 weight percent up to about 3 weight percent. In other embodiments, the aqueous steviol glycoside composition can have a rebaudioside D concentration ranging from greater than 0.02 weight percent up to about 2 weight percent, or from about 0.5 weight percent to about 1.5 weight percent, or from about 1 weight percent to about 1.5 weight percent. In particular embodiments, the rebaudioside D concentration in the aqueous steviol glycoside composition can be about 0.02 weight percent, about 0.1 weight percent, about 0.2 weight percent, about 0.3 weight percent, about 0.4 weight percent, about 0.5 weight percent, about 0.6 weight percent, about 0.7 weight percent, about 0.75 weight percent, about 0.8 weight percent, about 0.85 weight percent, about 0.90 weight percent, about 0.95 weight percent, about 1 weight percent, about 1.05 weight percent, about 1.1 weight percent, about 1.15 weight percent, about 1.2 weight percent, about 1.25 weight percent, about 1.3 weight percent, about 1.35 weight percent, about 1.36 weight percent, about 1.37 weight percent, about 1.38 weight percent, about 1.39 weight percent, about 1.4 weight percent, about 1.41 weight percent, about 1.42 weight percent, about 1.43 weight percent, about 1.44 weight percent, about 1.45 weight percent, about 1.46 weight percent, about 1.47 weight percent, about 1.48 weight percent, about 1.49 weight percent, about 1.5 weight percent, about 1.51 weight percent, about 1.52 weight percent, about 1.53 weight percent, about 1.54 weight percent, about 1.55 weight percent, about 1.56 weight percent, about 1.57 weight percent, about 1.58 weight percent, about 1.59 weight percent, about 1.6 weight percent, about 1.65 weight percent, about 1.7 weight percent, about 1.75 weight percent, about 1.8 weight percent, about 1.85 weight percent, about 1.9 weight percent, about 1.95 weight percent, about 2 weight percent, about 2.1 weight percent, about 2.2 weight percent, about 2.3 weight percent, about 2.4 weight percent, about 2.5 weight percent, about 2.6 weight percent, about 2.7 weight percent, about 2.8 weight percent, about 2.9 weight percent, or about 3 weight percent.

In particular embodiments, the rebaudioside D concentration in the aqueous steviol glycoside composition ranges from about 0.02 weight percent to about 3 weight percent, and in other embodiments, from about 0.5 weight percent to about 2 weight percent, from about 1 weight percent to about 2 weight percent, from about 1.2 weight percent to about 1.8 weight percent, or about 1.3 weight percent, about 1.4 weight percent, about 1.5 weight percent, about 1.6 weight percent, or about 1.7 weight percent. In even further embodiments, the rebaudioside D concentration in the aqueous steviol glycoside composition can be about 1.4 or about 1.5 weight percent. In other embodiments, the rebaudioside D concentration in the aqueous steviol glycoside composition ranges from about 1.5 weight percent to about 3 weight percent, and in other embodiments, from about 2 weight percent to about 3 weight percent, from about 2.1 weight percent to about 2.9 weight percent, from about 2.2 weight percent to about 2.8 weight percent, or about 2.3 weight percent, about 2.4 weight percent, about 2.5 weight percent, about 2.6 weight percent, or about 2.7 weight percent. In even further embodiments, the rebaudioside D concentration in the aqueous steviol glycoside composition can be about 2.4 or about 2.5 weight percent.

The aqueous steviol glycoside composition can have a stevioside concentration ranging from greater than 0.02 weight percent up to about 40 weight percent. In other embodiments, the aqueous steviol glycoside composition can have a stevioside concentration ranging from greater than 0.02 weight percent up to about 35 weight percent, or from greater than 0.02 weight percent up to about 30 weight percent. In particular embodiments, the stevioside concentration in the aqueous steviol glycoside composition can be about 0.02 weight percent, about 0.1 weight percent, about 0.2 weight percent, about 0.3 weight percent, about 0.4 weight percent, about 0.5 weight percent, about 0.6 weight percent, about 0.7 weight percent, about 0.8 weight percent, about 0.90 weight percent, about 1 weight percent, about 1.2 weight percent, about 1.4 weight percent, about 1.6 weight percent, about 1.8 weight percent, about 2 weight percent, about 2.2 weight percent, about 2.4 weight percent, about 2.6 weight percent, about 2.8 weight percent, about 3 weight percent, about 3.2 weight percent, about 3.4 weight percent, about 3.6 weight percent, about 3.8 weight percent, about 4 weight percent, about 4.2 weight percent, about 4.4 weight percent, about 4.6 weight percent, about 4.8 weight percent, about 5 weight percent, about 5.2 weight percent, about 5.4 weight percent, about 5.6 weight percent, about 5.8 weight percent, about 6 weight percent, about 7 weight percent, about 8 weight percent, about 9 weight percent, about 10 weight percent, about 12 weight percent, about 14 weight percent, about 16 weight percent, about 18 weight percent, about 20 weight percent, about 25 weight percent, about 30 weight percent, about 35 weight percent, or about 40 weight percent.

The aqueous steviol glycoside composition can be prepared by dissolving the sweetening composition in an appropriate amount of water, either at room temperature, i.e. about 18° C. to about 23° C., or at a modestly elevated temperature, such as from about 25° C. up to about 75° C., or from about 30° C. up to about 70° C., or from about 30° C. up to about 65° C. Alternatively, the aqueous steviol glycoside composition can be prepared by suspending a known quantity of rebaudioside D in water either at room temperature, i.e. about 18° C. to about 23° C., or at a modestly elevated temperature, such as from about 25° C. up to about 75° C., or from about 30° C. up to about 70° C., or from about 30° C. up to about 65° C., and subsequently adding a known quantity of the stevioside composition to the suspension. In a further alternative, the stevioside composition can be dissolved in an appropriate volume of water either at room temperature, i.e. about 18° C. to about 23° C., or at a modestly elevated temperature, such as from about 25° C. up to about 75° C., or from about 30° C. up to about 70° C., or from about 30° C. up to about 65° C., and subsequently be combined with an appropriate amount of rebaudioside D.

In some embodiments, a sufficient amount of the sweetening composition can be dissolved in water, or other appropriate diluent, other than, in certain embodiments, a liquid alcohol or polyol, at 25° C. to form an aqueous steviol glycoside composition comprising from about 50 ppm to about 5000 ppm of the sweetening composition. In other embodiments, a sufficient amount of the solid sweetening composition can be dissolved in water, or other appropriate diluent, other than, in certain embodiments, a liquid alcohol or polyol, at 25° C. to form an aqueous steviol glycoside composition comprising from about 100 ppm to about 1000 ppm, or from about 200 ppm to about 800 ppm, or from about 300 ppm to about 600 ppm, or from about 400 ppm to about 500 ppm, or about 400 ppm of the sweetening composition.

In some embodiments, a sufficient amount of the solid sweetening composition can be dissolved in water, or other appropriate diluent, other than, in certain embodiments, a liquid alcohol or polyol, at 25° C. to form an aqueous steviol glycoside composition comprising from about 50 ppm to about 1000 ppm of rebaudioside D. In other embodiments, a sufficient amount of the solid sweetening composition can be dissolved in water, or other appropriate diluent, other than, in certain embodiments, a liquid alcohol or polyol, at 25° C. to form an aqueous steviol glycoside composition comprising from about 50 ppm to about 800 ppm, or from about 50 ppm to about 600 ppm, or from about 50 ppm to about 400 ppm, or from about 50 ppm to about 300 ppm, or from about 50 ppm to about 200 ppm, or from about 50 ppm to about 100 ppm, or about 80 ppm of rebaudioside D.

During preparation, the aqueous steviol glycoside composition can be mixed at high or low shear and at any of the identified temperatures, as necessary, to induce or aid dissolution. It is within the skill of the ordinary skilled artisan to identify the appropriate shear level and/or temperature for a given mixture to obtain the results described herein.

In some embodiments, the aqueous steviol glycoside composition can be spray dried to prepare a spray dried sweetening composition. In some embodiments, the spray dried sweetening composition can be in the form of a powder having particle sizes ranging from about 10 microns to about 300 microns in diameter.

The spray dried sweetening composition can be prepared using suitable methods known to those of ordinary skill in the art. For example, in certain embodiments, a Buchi® mini spray dryer can be used to produce the spray dried sweetening composition.

In some embodiments, this disclosure provides a spray dried sweetening composition comprising rebaudioside D and a stevioside composition, wherein the spray dried sweetening composition is in the form of a powder.

In some embodiments, the stevioside composition and the rebaudioside D are present in a ratio of from about 1:1 to about 12:1 by weight.

In other embodiments, the stevioside composition and the rebaudioside D are present in a ratio of from about 2:1 to about 7:1 by weight.

In other embodiments, the stevioside composition and the rebaudioside D are present in a ratio of about 2:1, about 3:1, about 5:1 or about 6:1 by weight.

In some embodiments, the stevioside composition comprises stevioside and a second steviol glycoside.

In some embodiments, the second steviol glycoside is selected from the group consisting of rebaudioside A, rebaudioside B, rebaudioside C, rebaudioside E, rebaudioside F, rebaudioside G, rebaudioside H, rebaudioside I, rebaudioside J, rebaudioside K, rebaudioside L, rebaudioside M, rebaudioside O), steviolbioside, rubusoside, and dulcoside A. In other embodiments, the second steviol glycoside is rebaudioside A, rebaudioside B, rebaudioside C, or rebaudioside M. In other embodiments, the second steviol glycoside is rebaudioside A.

In some embodiments, the spray dried sweetening composition is sufficiently soluble in water at room temperature to provide a rebaudioside D concentration from up to about 500 ppm to up to about 10,000 ppm without a requirement for heating or other measures to induce rebaudioside D solubility. In particular embodiments, the spray dried sweetening composition is sufficiently soluble in water at room temperature to provide a rebaudioside D concentration up to about 500 ppm, or up to about 1000 ppm, or up to about 1500 ppm, or up to about 2000 ppm, or up to about 2500 ppm, or up to about 3000 ppm, or up to about 3500 ppm, or up to about 4000 ppm, or up to about 4500 ppm, or up to about 5000 ppm, or up to about 5500 ppm, or up to about 6000 ppm, or up to about 6500 ppm, or up to about 7000 ppm, or up to about 7500 ppm, or up to about 8000 ppm, or up to about 8500 ppm, or up to about 9000 ppm, or up to about 9500 ppm, or up to about 10,000 ppm without a requirement for heating or other measures to induce rebaudioside D solubility.

In some embodiments, the spray dried sweetening composition is soluble in water up to a concentration of 15,000 ppm in terms of the amount of rebaudioside D.

In other embodiments, the spray dried sweetening composition is soluble in water up to a concentration of 20,000 ppm in terms of the amount of rebaudioside D.

In certain embodiments, the spray dried sweetening composition is soluble in water up to a concentration of 25,000 ppm in terms of the amount of rebaudioside D.

In some embodiments, the spray dried sweetening composition is soluble in water up to a concentration of 30,000 ppm in terms of the amount of rebaudioside D.

In certain embodiments, the water is "treated water." Treated water is water that has been treated to reduce the total dissolved solids to less than about 500 ppm, and in certain embodiments, to less than about 250 ppm total dissolved solids, prior to optional supplementation with calcium as disclosed in U.S. Pat. No. 7,052,725, which is incorporated by reference in its entirety. Methods of producing treated water are known to those of ordinary skill in the art and include deionization, distillation, filtration, and reverse osmosis ("r-o"), among others.

The aqueous steviol glycoside composition is generally free of any co-solvents, such as alcohols and/or polyols. Exemplary alcohols and polyols that can be excluded from this composition include, but are not limited to, ethanol, erythritol, and glycerol.

In certain embodiments, the aqueous steviol glycoside composition can be stable for at least one day, at least one week, at least two weeks, at least three week, at least one month, at least two months, at least three months, at least four months, at least five months, at least six months, at least seven months, at least eight months, at least nine months, at least ten months, at least eleven months, or at least a year. Stability can be aided by the presence of one or more antioxidants, as described elsewhere herein, as well as the presence of one or more acids, such as any of those described herein. In certain embodiments, though, the aqueous steviol glycoside composition can be stable for the periods of time noted above in the absence of any additional components.

In certain embodiments, the aqueous steviol glycoside composition can be further diluted with water or other appropriate diluent, other than, in certain embodiments, a liquid alcohol or polyol, to prepare a syrup having a rebaudioside D concentration ranging from about 150 ppm to about 1000 ppm, and in particular embodiments, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, about 350 ppm, about 360 ppm, about 370 ppm, about 380 ppm, about 390 ppm, about 400 ppm, about 410 ppm, about 420 ppm, about 430 ppm, about 440 ppm, about 450 ppm, about 460 ppm, about 470 ppm, about 480 ppm, about 490 ppm, about 500 ppm, about 510 ppm, about 520 ppm, about 530 ppm, about 540 ppm, about 550 ppm, about 560 ppm, about 570 ppm, about 580 ppm, about 590 ppm, about 600 ppm, about 610 ppm, about 620 ppm, about 630 ppm, about 640 ppm, about 650 ppm, about 660 ppm, about 670 ppm, about 680 ppm, about 690 ppm, about 700 ppm, about 710 ppm, about 720 ppm, about 730 ppm, about 740 ppm, about 750 ppm, about 760 ppm, about 770 ppm, about 780 ppm, about 790 ppm, about 800 ppm, about 810 ppm, about 820 ppm, about 830 ppm, about 840 ppm, about 850 ppm, about 860 ppm, about 870 ppm, about 880 ppm, about 890 ppm, about 900 ppm, about 910 ppm, about 920 ppm, about 930 ppm, about 940 ppm, about 950 ppm, about 960 ppm, about 970 ppm, about 980 ppm, about 990 ppm, about 1000 ppm, or any ranges between any of these values.

In particular embodiments, the syrup comprising the aqueous steviol glycoside composition can comprise from about 150 to about 500 ppm rebaudioside D. In other embodiments, the syrup comprising the aqueous steviol glycoside composition can comprise from about 180 to about 450 ppm rebaudioside D. It is within the skill of the ordinarily skilled beverage formulator to prepare a syrup having the desired rebaudioside D concentration from the aqueous steviol glycoside composition.

Additional Ingredients

In certain embodiments, the aqueous steviol glycoside composition, or a syrup comprising it, can also include one or more nutritive sweeteners, such as sucrose or high fructose corn syrup. In certain embodiments, the nutritive sweetener can be present in the aqueous steviol glycoside composition at from about 6% to about 71% by weight of the aqueous steviol glycoside composition, such as from about 18% to about 62% by weight, or from about 30% to about 45% by weight, depending upon the desired level of sweetness.

In certain embodiments, the aqueous steviol glycoside composition can further include up to about 18 weight percent of D-psicose, erythritol, or a combination thereof. In other embodiments, D-psicose or erythritol can be present in the aqueous steviol glycoside composition in an amount of from about 3 to about 9 weight percent. Alternatively, D-psicose can be present in the aqueous steviol glycoside composition in an amount ranging from about 3 to about 9 weight percent and erythritol can be present in the aqueous steviol glycoside composition in an amount of from about 3 to about 6 weight percent. In other embodiments, D-psicose, erythritol, or both can be completely or substantially absent from the aqueous steviol glycoside composition.

In certain embodiments, the aqueous steviol glycoside composition, or a syrup comprising it, can also contain a flavor composition, for example, natural, nature identical, and/or synthetic fruit flavors, botanical flavors, other flavors, and mixtures thereof. Exemplary fruit flavors include, but are not limited to, orange, lemon, lime grapefruit, tangerine, mandarin orange, tangelo, pomelo, apple, grape, cherry, and pineapple flavors. Botanical flavors include, but are not limited to, cola flavors, tea flavors, and mixtures thereof. In certain embodiments, the aqueous steviol glycoside composition further comprises a cola flavor or a tea flavor.

Other suitable flavorings include, but are not limited to, cassia, clove, cinnamon, pepper, ginger, vanilla spice flavorings, cardamom, coriander, root beer, sassafras, ginseng, and others. Flavorings may be in the form of an extract, oleoresin, juice concentrate, bottler's base, or other forms known in the art.

The particular amount of the flavor component useful for imparting flavor characteristics depend upon the flavor(s) selected, the flavor impression desired, and the form of the flavor component. Those skilled in the art, given the benefit of this disclosure, will be readily able to determine the amount of any particular flavor component(s) necessary to achieve the desired flavor impression.

The one or more flavorings may be used in the form of an emulsion. A flavoring emulsion can be prepared by mixing some or all of the flavorings together, optionally together with other ingredients of the food or beverage, and an emulsifying agent. The emulsifying agent can be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage compositions, given the benefit of this disclosure. The emulsifier in exemplary embodiments comprises greater than about 3% of the mixture of flavorings and emulsifier. In certain exemplary embodiments the emulsifier can comprise from about 5% to about 30% of the mixture.

In certain embodiments, the aqueous steviol glycoside composition, or a syrup comprising it, can further include caffeine.

In some embodiments, the aqueous steviol glycoside composition, or a syrup comprising it, can further include additional ingredients, including, generally, any of those typically found in food and beverage compositions. Examples of such additional ingredients include, but are not limited to, caramel and other coloring agents or dyes, foaming or antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), B (thiamine), B2 (riboflavin), B6, B12, K, niacin, folic acid, biotin, and combinations thereof. The optional non-mineral nutritional supplements are typically present in amounts generally accepted under good manufacturing practices. Exemplary amounts can be between about 1% and about 100% Recommended Daily Value (RDV), where such RDVs are established. In certain exemplary embodiments the non-mineral nutritional supplement ingredient(s) can be present in an amount of from about 5% to about 20% RDV, where established.

In certain embodiments, the aqueous steviol glycoside composition, or a syrup comprising it, can also include one or more preservatives. Solutions with a pH below 4 and especially those below 3 typically are "micro-stable," i.e., they resist growth of microorganisms, and so are suitable for longer term storage prior to consumption without the need for further preservatives. However, an additional preservative system can be used if desired. As used here, the terms "preservative system" or "preservatives" include all suitable preservatives approved for use in food and beverage compositions, including, without limitation, such known chemical preservatives as benzoates, such as sodium, calcium, and potassium benzoate, sorbates, such as sodium, calcium, and potassium sorbate, citrates, such as sodium citrate and potassium citrate, polyphosphates, such as sodium hexametaphosphate (SHMP), and mixtures thereof, and antioxidants such as ascorbic acid, EDTA, BHA, BHT, TBHQ, dehydroacetic acid, dimethyldicarbonate, ethoxyquin, heptylparaben, and combinations thereof. Preservatives may be used in amounts not exceeding mandated maximum levels under applicable laws and regulations. In some embodiments, the aqueous steviol glycoside composition or a syrup comprising it, can include potassium sorbate.

In certain embodiments, the aqueous steviol glycoside composition, and syrups comprising it, can include an antioxidant selected from the group consisting of rutin, quercetin, flavonones, flavones, dihydroflavonols, flavonols, flavandiols, leucoanthocyanidins, flavonol glycosides, flavonone glycosides, isoflavonoids, and neoflavonoids. In particular, the flavonoids may be, but not limited to, quercetin, eriocitrin, neoeriocitrin, narirutin, naringin, hesperidin, hesperetin, neohesperidin, neoponcirin, poncirin, rutin, isorhoifolin, rhoifolin, diosmin, neodiosmin, sinensetin, nobiletin, tangeritin, catechin, catechin gallate, epigallocatechin, epigallocatechin gallate, oolong tea polymerized polyphenol, anthocyanin, heptamethoxyflavone, daidzin, daidzein, biochaminn A, prunetin, genistin, glycitein, glycitin, genistein, 6,7,4' trihydroxy isoflavone, morin, apigenin, vitexin, balcalein, apiin, cupressuflavone, datiscetin, diosmetin, fisetin, galangin, gossypetin, geraldol, hinokiflavone, primuletin, pratol, luteolin, myricetin, orientin, robinetin, quercetagetin, and hydroxy-4-flavone.

The aqueous steviol glycoside composition, along with syrups comprising it, can also optionally include one or more suitable food grade acids. Exemplary acids are water soluble organic acids and their salts and include, for example, phosphoric acid, sorbic acid, ascorbic acid, benzoic acid, citric acid, tartaric acid, propionic acid, butyric acid, acetic acid, succinic acid, glutaric acid, maleic acid, malic acid, valeric acid, caproic acid, malonic acid, aconitic acid, potassium sorbate, sodium benzoate, sodium citrate, amino acids, and combinations of any of them. In particular embodiments, the aqueous steviol glycoside composition, or a syrup comprising the composition, includes malic acid and/or phosphoric acid.

Kits

In certain embodiments, this disclosure also includes a kit comprising the aqueous steviol glycoside composition. In addition to the aqueous steviol glycoside composition, the kit can comprise any of the additional elements required for preparing a syrup, such as flavorings, acids, antioxidants, etc., exclusive of, or optionally including, any additional water that might be required to dilute the aqueous steviol glycoside composition to prepare a syrup. The kit can further include instructions for preparing a syrup or a beverage from the aqueous steviol glycoside composition and other optionally present elements included in the kit. In certain embodiments the kit can be provided to a beverage bottler or to a beverage retailer.

In other embodiments, this disclosure includes a kit comprising a syrup comprising the aqueous steviol glycoside composition. In certain embodiments, the kit can include the syrup as well as instructions for preparing a beverage from the syrup. For example, when provided to a bottler, the kit can contain instructions for preparing beverages on a commercial scale. When provided to a retailer, the kit can contain instructions for preparing beverages using a post-mix delivery system, such as calibration instructions, etc.

This disclosure further include kits comprising one or more pods, cartridges, or other containers adapted to store a sufficient quantity of the syrup comprising the aqueous steviol glycoside composition to prepare a single- or multiple-serve beverage from the syrup. In some embodiments, the kit can further include a beverage-dispensing apparatus adapted to receive the one or more pods or cartridges, wherein, upon activation by a user, the beverage dispensing apparatus combines the contents of one pod or cartridge with an appropriate volume of optionally carbonated water, or other diluent, to provide a single- or multiple-serve beverage. In still further embodiments, the kit can include instructions for operating the beverage-dispensing apparatus, cleaning the apparatus, and refilling and/or recycling spent pods or cartridges. In certain embodiments, the beverage-dispensing apparatus can be suitable for use in a commercial setting, such as a retail environment. In other embodiments, the beverage dispensing apparatus can be suitable for home or "on the go" use. Pods and cartridges adapted to store syrup for preparing single- or multiple-serve beverages as well as beverage dispensing apparatuses adapted to receive pods and cartridges for preparing a single- or multiple-serve beverage, both for home and commercial use, are known to those of ordinary skill in the art.

Zero- or Low-Calorie Beverages

In addition to the aqueous steviol glycoside composition, syrup, and kits comprising the aqueous steviol glycoside composition or syrup discussed above, this disclosure also provides zero- or low-calorie beverages prepared using the aqueous steviol glycoside composition or a syrup comprising the aqueous steviol glycoside composition.

Generally speaking, beverages prepared directly from the aqueous steviol glycoside composition or from a syrup comprising the aqueous steviol glycoside composition, will have a rebaudioside D concentration ranging from about 5 ppm to about 100 ppm. In certain embodiments, the rebaudioside D concentration in the zero- or low-calorie beverage will range from about 5 ppm to about 95 ppm, from about 5 ppm to about 90 ppm, from about 5 ppm to about 85 ppm, from about 5 ppm to about 80 ppm, or from about 5 ppm to about 75 ppm. In particular embodiments, the beverage will comprise about 5 ppm, about 10 ppm, about 15 ppm, about 20 ppm, about 25 ppm, about 30 ppm, about 35 ppm, about 40 ppm, about 45 ppm, about 50 ppm, about 55 ppm, about 60 ppm, about 65 ppm, about 70 ppm, about 75 ppm, about 80 ppm, about 85 ppm, about 90 ppm, about 95 ppm, or about 100 ppm rebaudioside. In additional embodiments, the beverage can comprise about 30 ppm or about 75 ppm. Whether the beverage is prepared directly from the aqueous steviol glycoside composition or from a syrup comprising the aqueous steviol glycoside composition, it is within the skill of the ordinary skilled artisan to select the appropriate amount of water for diluting the starting material to arrive at a beverage having the rebaudioside D concentration specified above.

In some embodiments, a beverage can be prepared directly from the aqueous steviol glycoside composition by combining, for example, about one part by volume of the aqueous steviol glycoside composition with about 160 to about 530 parts water, for an aqueous steviol glycoside composition comprising about 1.3 to about 1.5 weight percent rebaudioside D. Of course, the amount of water required to dilute an aqueous steviol glycoside composition having a rebaudioside D concentration other than about 1.3 weight percent to about 1.5 weight percent will vary from the values noted above. That said, and as noted above, it is within the skill of the ordinary skilled artisan to select the appropriate amount of water for diluting the aqueous steviol glycoside composition to arrive at a beverage having a rebaudioside D concentration specified herein.

Thus, in certain embodiments, this disclosure provides beverages comprising at least one part of the aqueous steviol glycoside composition and an amount of water or other diluent sufficient to provide a beverage having a rebaudioside D concentration ranging from about 5 ppm to about 95 ppm, and in certain embodiments, ranging from about 20 ppm to about 75 ppm.

In certain embodiments, beverages can be prepared by combining about one part of a syrup comprising the aqueous steviol glycoside composition with about three to about seven parts water. In certain embodiments, a full strength beverage can be prepared by combining one part of the syrup comprising the aqueous steviol glycoside composition with five parts water. In certain exemplary embodiments the water added to the aqueous steviol glycoside composition to form the beverage can be carbonated.

Thus, this disclosure provides zero- or low-calorie beverages comprising about one part of a syrup comprising the aqueous steviol glycoside composition and about 3 to about 10 parts water, all by volume. In another embodiment, this disclosure provides zero- or low-calorie beverages comprising about one part of the syrup comprising the aqueous steviol glycoside composition and about five parts water, by volume. In some embodiments, the water can be carbonated.

In certain embodiments, the zero- or low-calorie beverage can be a carbonated or non-carbonated soft drink, a fountain beverage, a frozen ready-to-drink beverage, a coffee, a tea or other brewed beverage, a dairy beverage, a flavored water, an enhanced water, a juice such as a zero- or low-calorie fruit juice (including diluted and ready to drink concentrated juices), a fruit juice-flavored drink, a sport drink, a smoothie, a functionally enhanced beverage such as a caffeinated energy drink, or an alcoholic beverage. In particular embodiments, the beverage composition can be a cola beverage.

In some embodiments, the beverage can be a cola-flavored carbonated beverage, characteristically containing, amongst other things, water, sweetener, kola nut extract and/or other flavorings, caramel coloring, phosphoric acid, optionally caffeine, and optionally other ingredients. Additional and alternative suitable ingredients will be recognized by those skilled in the art given the benefit of this disclosure.

Carbon dioxide can be used to provide effervescence to certain exemplary embodiments of the beverages disclosed here. Any of the techniques and carbonating equipment known in the art for carbonating beverages can be employed. Carbon dioxide can enhance beverage taste and appearance and may aid in safeguarding the beverage purity by inhibiting and/or destroying objectionable bacteria. In certain embodiments, for example, the beverage can have a $CO_2$ level up to about 4.0 volumes carbon dioxide. Other embodiments can have, for example, from about 0.5 to about 5.0 volumes of carbon dioxide. As used herein, one volume of carbon dioxide refers to the amount of carbon dioxide absorbed by a given quantity of a given liquid, such as water, at 60° F. (16° C.) and one atmospheric pressure. A volume of gas occupies the same space as does the liquid by which it is dissolved. The carbon dioxide content can be selected by those skilled in the art based on the desired level of effervescence and the impact of the carbon dioxide on the taste or mouthfeel of the beverage.

In some embodiments, the beverage comprises water and a stevioside/rebaudioside D complex.

In some embodiments, the stevioside and rebaudioside D can be present in the beverage at a ratio of from about 1:1 to about 20:1 by weight, respectively. In other embodiments, the stevioside and rebaudioside D can be present in the beverage at a ratio of from about 1:1 to about 15:1 by weight.

In some embodiments, the stevioside and rebaudioside D are present in the beverage at a ratio from about 1:1 to about 12:1 by weight.

In other embodiments, the stevioside and the rebaudioside D are present in the beverage at a ratio of from about 2:1 to about 7:1 by weight.

In other embodiments, the stevioside and the rebaudioside D are present in the beverage at a ratio of about 2:1, about 3:1, about 5:1 or about 6:1 by weight.

In some embodiments, the beverage further comprises a steviol glycoside other than rebaudioside D or stevioside.

In some embodiments, the steviol glycoside other than rebaudioside D or stevioside is selected from the group consisting of rebaudioside A, rebaudioside B, rebaudioside C, rebaudioside E, rebaudioside F, rebaudioside G, rebaudioside H, rebaudioside I, rebaudioside J, rebaudioside K, rebaudioside L, rebaudioside M, rebaudioside O, steviolbioside, rubusoside, and dulcoside A. In other embodiments, the steviol glycoside other than rebaudioside D or stevioside is rebaudioside A, rebaudioside B, rebaudioside C, or rebaudioside M. In other embodiments, the steviol glycoside other than rebaudioside D or stevioside is rebaudioside A.

Reduced Calorie Food Products

In addition to the zero- or low-calorie beverages discussed above, this disclosure also provides reduced calorie food products comprising the sweetening compositions described herein.

Exemplary food products that can incorporate the sweetening compositions described herein include, but are not limited to, oatmeal, cereal, baked goods, cookies, crackers, cakes, brownies, breads, snack foods, such as snack bars, potato or tortilla chips, popcorn, rice cakes, and other grain-based food products.

In some embodiments, the sweetening compositions described herein can be added in solid form, such as a powder or granules, to a food product.

In other embodiments, the sweetening compositions described herein can be added to a food product as a liquid.

In certain embodiments, both the liquid and solid compositions can be added to the food product.

Pharmaceutical Compositions

This disclosure also provides a pharmaceutical composition comprising an active pharmaceutical ingredient (API) and the sweetening composition described herein. Exemplary active pharmaceutical ingredients include, but are not limited to, antacids, reflux suppressants, antiflatulents, antidopaminergics, proton pump inhibitors, cytoprotectants, prostaglandin analogues, laxatives, antispasmodics, antidiarrhoeals, bile acid sequestrants, opioids, beta-receptor blockers, calcium channel blockers, diuretics, cardiac glycosides, antiarrhythmics, nitrates, antianginals, vasoconstrictors, vasodilators, peripheral activators, ACE inhibitors, angiotensin receptor blockers, alpha blockers, anticoagulants, heparin, antiplatelet drugs, fibrinolytics, anti-hemophilic factors, haemostatic drugs, hypolipidaemic agents, statins, hynoptics, anaesthetics, antipsychotics, antidepressants, anti-emetics, anticonvulsants, antiepileptics, anxiolytics, barbiturates, movement disorder drugs, stimulants, benzodiazepines, cyclopyrrolones, dopamine antagonists, antihistamines, cholinergics, anticholinergics, emetics, cannabinoids, analgesics, muscle relaxants, antibiotics, aminoglycosides, anti-virals, anti-fungals, anti-inflammatories, anti-gluacoma drugs, sympathomimetics, steroids, ceruminolytics, bronchodilators, NSAIDS, antitussive, mucolytics, decongestants, corticosteroids, androgens, antiandrogens, gonadotropins, growth hormones, insulin, antidiabetics, thyroid hormones, calcitonin, diphosponates, vasopressin analogues, alkalizing agents, quinolones, anticholinesterase, sildenafil, oral contraceptives. Hormone Replacement Therapies, bone regulators, follicle stimulating hormones, luteinizings hormones, gamolenic acid, progestogen, dopamine agonist, oestrogen, prostaglandin, gonadorelin, clomiphene, tamoxifen, diethylstilbestrol, antileprotics, antituberculous drugs, antimalarials, anthelmintics, antiprotozoal, antiserums, vaccines, interferons, tonics, vitamins, cydotoxic drugs, sex hormones, aromatase inhibitors, somatostatin inhibitors, or similar type substances, or combinations thereof. In some embodiments, the sweetening composition can mask an unpleasant or undesirable taste associated with the API by increasing the sweetness of a pharmaceutical composition comprising the API.

In some embodiments, the sweetening composition can be added in solid form, such as a powder or granules, to a pharmaceutical composition. In other embodiments, the sweetening composition can be added in liquid form, such as a concentrate or syrup, to a pharmaceutical composition.

In some embodiments, the sweetening compositions of the present disclosure can be used in a solid pharmaceutical composition. In other embodiments, the sweetening compositions can be used in a liquid pharmaceutical composition.

Natural Embodiments

Certain embodiments of the described compositions can be "natural" in that they do not contain anything artificial or synthetic (including any color additives regardless of source) that would not normally be expected to be in the food. As used herein, therefore, a "natural" composition is defined in accordance with the following guidelines: Raw materials for a natural ingredient exists or originates in nature. Biological synthesis involving fermentation and enzymes can be employed, but synthesis with chemical reagents is not utilized. Artificial colors, preservatives, and flavors are not considered natural ingredients. Ingredients may be processed or purified through certain specified techniques including at least: physical processes, fermentation, and enzymolysis. Appropriate processes and purification techniques include at least: absorption, adsorption, agglomeration, centrifugation, chopping, cooking (baking, frying, boiling, roasting), cooling, cutting, chromatography, coating, crystallization, digestion, drying (spray, freeze drying, vacuum), evaporation, distillation, electrophoresis, emulsification, encapsulation, extraction, extrusion, filtration, fermentation, grinding, infusion, maceration, microbiological (rennet, enzymes), mixing, peeling, percolation, refrigeration/freezing, squeezing, steeping, washing, heating, mixing, ion exchange, lyophilization, osmose, precipitation, salting out, sublimation, ultrasonic treatment, concentration, flocculation, homogenization, reconstitution, enzymolysis (using enzymes found in nature). Processing aids (currently defined as substances used as manufacturing aids to enhance the appeal or utility of a food component, including clarifying agents, catalysts, flocculants, filter aids, and crystallization inhibitors, etc. See 21 CFR § 170.3(o)(24)) are considered incidental additives and may be used if removed appropriately.

EXAMPLES

The compositions and beverages described herein are now further detailed with reference to the following examples. These examples are provided for the purpose of illustration only and the embodiments described herein should in no way be construed as being limited to these examples. Rather, the embodiments should be construed to encompass any and all variations which become evident as a result of the teaching provided herein.

For the examples below, turbidity is reported in NTUs and was measured at 20±2° C. using a Hach 2100AN Turbidimeter. The instrument was calibrated using a STABLCAL Calibration Kit including samples having turbidities ranging from 0.1 NTU to 7500 NTU. Test samples were measured in a Turbidimeter glass vial and NTU values were read after a 30 second stabilization period.

Example 1

Room Temperature Rebaudioside D Solubility

Rebaudioside D was added to a number of beakers in increasing concentrations (0.02 weight percent, 0.04 weight percent, 0.1 weight percent, 0.5 weight percent, 1 weight percent, and 1.5 weight percent) at ambient temperature. Turbidity measurements were taken to track solubility in the various samples and the results were plotted (FIG. 1). FIG. 1 shows that rebaudioside D is insoluble in water at room temperature, even at very low concentrations.

Beginning at 0.5 weight percent, turbidity reached a maximum of 10,000 to 12,000 NTU (Nephelometric Turbidity Units), indicating that no light was able to pass through the higher concentration samples.

Example 2

Rebaudioside D Solubility at Elevated Temperatures

The samples prepared in Example 1 were heated to 70° C. and turbidity was measured again. At 70° C., the 0.5 weight percent rebaudioside D sample was soluble. But the 1 and 1.5 weight percent rebaudioside D samples continued to show maximum turbidity (about 12,000 NTU).

Example 3

Solubility Studies

Suspensions of 1 weight percent rebaudioside D in water at ambient temperature were prepared in five individual beakers. Rebaudioside A, stevioside, rebaudioside C, and rebaudioside M were added to each of the first four beakers, respectively, such that that the resulting weight ratio of rebaudioside D to the added steviol glycoside was 1:5. As a control, no additional steviol glycoside was added to the fifth beaker.

Figure 2:
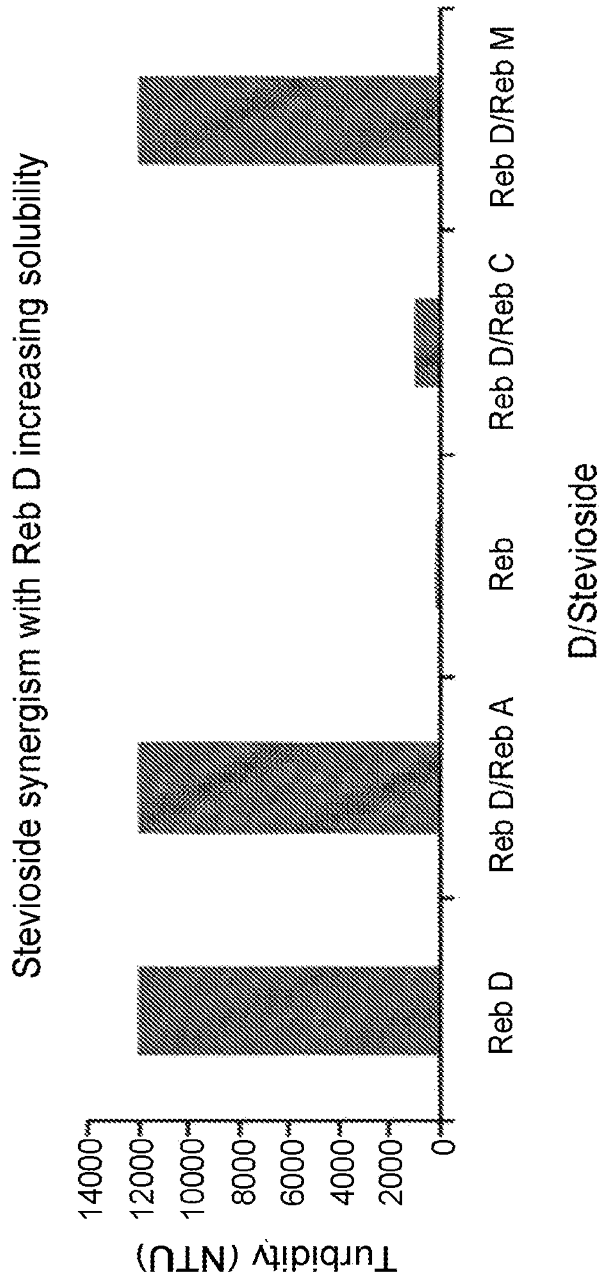
FIG. 2 is a bar graph showing the solubility of rebaudioside D in combination with various steviol glycosides at room temperature.
Figure 3:
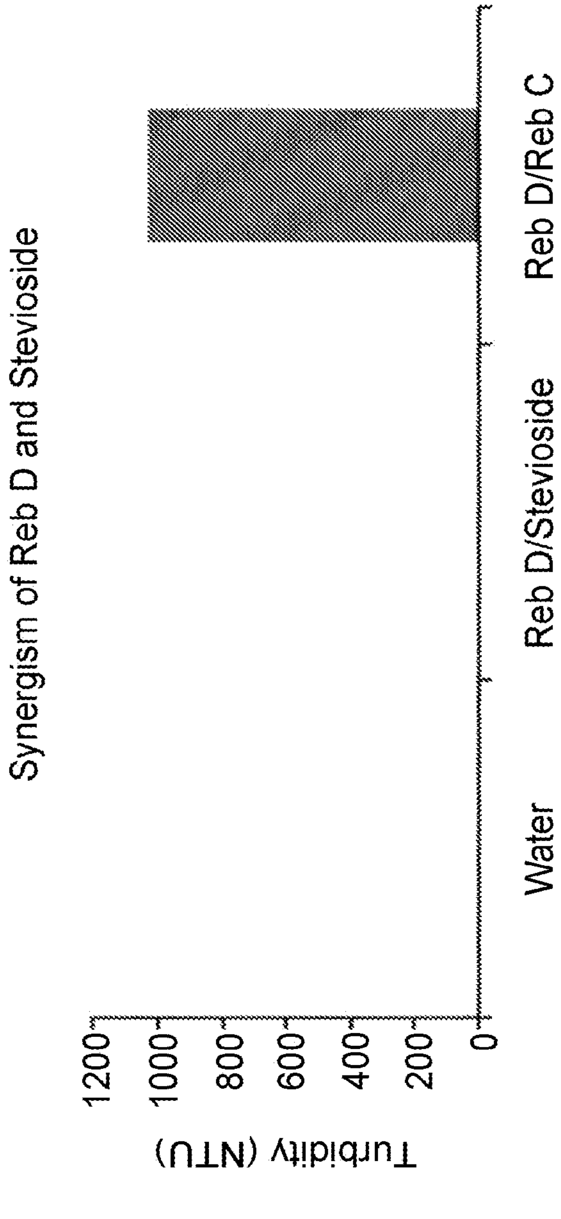
FIG. 3 is a bar graph showing the differences in turbidity between a rebaudioside D/stevioside mixture and a rebaudioside D/rebaudioside C mixture.

After stirring, turbidity measurements were taken from each of the five samples and graphed. The results are shown in FIG. 2. According to the turbidity measurements, rebaudiosides A and M had no effect on rebaudioside D solubility. However, a surprisingly synergistic relationship between rebaudioside D and stevioside was discovered, as the 5:1 (weight/weight) mixture of stevioside to rebaudioside D resulted in a clear mixture. The combination of rebaudioside C and rebaudioside D also resulted in increased rebaudioside D solubility. However, as is shown in FIG. 3 which includes a water control, rebaudioside C did not effectively solubilize rebaudioside D, resulting in a turbid suspension (about 1000 NTU).

Example 4

Temperature and Low Shear Mixing

This study was conducted with a 5:1 mixture (weight/weight) of rebaudioside A and rebaudioside D and a 5:1 mixture (weight/weight) of a rebaudioside A composition and rebaudioside D, wherein the rebaudioside A composition included 30 weight percent stevioside.

The described blends were individually combined with water to produce compositions having rebaudioside D concentrations of 1.4 weight percent based on the total mass of the mixture, including water. The mixtures were then mixed under low shear for 10 minutes at ambient temperature (21° C.). A 100 g sample was removed and centrifuged, and the resulting supernatant was analyzed for turbidity and rebaudioside A and D concentration (HPLC).

The mixtures were then warmed to 45° C. and mixed for 10 minutes. Another 100 g sample was removed and analyzed as described above.

The mixtures were finally warmed to 65° C. and mixed for 10 minutes. Another 100 g sample was removed an analyzed as described above.

At each of 21° C., 45° C., and 65° C., neither rebaudioside A nor the rebaudioside A/stevioside composition including 30 weight percent stevioside enhanced the solubility of rebaudioside D. This data suggested that a 1.5:1 stevioside to rebaudioside D mixture at the concentrations described above, mixed at low shear, even at elevated temperature, was not sufficient to solubilize rebaudioside D.

This experiment was repeated with 10:1 mixtures of the compositions described above, wherein the final rebaudioside D concentration in each of the compositions was 1.43 weight percent, based on the total mass of the composition, including water. Similar to the 5:1 variation, the rebaudioside A only mixture did not enhance the solubility of rebaudioside D. However, the 10:1 mixture (weight/weight) prepared using the rebaudioside A composition comprising 30 weight percent stevioside (3:1 stevioside:rebaudioside D) resulted in a clear solution.

Example 5

High Shear Mixing

A 1.5 weight percent colloidal dispersion of rebaudioside D was prepared in 150 L of water in a dissolution tank at 65° C. An amount of a rebaudioside A composition comprising 30 weight percent stevioside was added to the solution under high shear until the final ratio (weight/weight) of the rebaudioside A composition to rebaudioside D was 5:1. This process resulted in a clear solution having a 1.5:1 stevioside to rebaudioside D ratio. This result suggests that shear and temperature play a role in rebaudioside D solubility.

Example 6

Specific Compositions

Aqueous steviol glycoside compositions were prepared from water and sweetening compositions 1, 2, and 3 described in Table 1, according to the methodologies described above to give aqueous steviol glycoside compositions having a final rebaudioside D concentration of 1.5 weight percent based on the total weight of the aqueous steviol glycoside composition.

TABLE 1

| | Reb A (wt %) | Stevioside (wt %) | Reb D (wt %) |
|---|---|---|---|
| Comp. 1 | 52.6 | 24 | 15.5 |
| Comp. 2 | 67.4 | 11.4 | 15.5 |
| Comp. 3 | 84 | 0.9 | 14 |

For each of Compositions 1, 2, and 3, above, rebaudioside D was completely dissolved. Additionally, in each of the compositions noted above, the following steviol glycosides were undetectable:rebaudioside E, rebaudioside M, rubusoside, steviolboiside, and rebaudioside G.

Example 7

Rebaudioside D and Stevioside Solubility Studies

Aqueous samples containing the amounts of rebaudioside D and stevioside listed in Table 2 were prepared by combining the noted amounts of rebaudioside D and stevioside in water. The samples were then warmed to the temperatures noted in the table.

The appearance of all the samples prepared as above was noted, and turbidity was measured to track solubility. The results are shown in Table 2.

TABLE 2

| No | Reb D % | Stevioside % | Appearance | NTU | Temp (C.) | Stevioside:Reb D Ratio |
|---|---|---|---|---|---|---|
| 1 | 0.4 | 0 | Cloudy | 1937 | 70 | 0.0 |
| 2 | 0.4 | 0.4 | Slightly hazy | 13.7 | 70 | 1.0 |
| 3 | 0.4 | 0.8 | Clear | 1.47 | 70 | 2.0 |
| 4 | 0.4 | 1.2 | Clear | 1.13 | 70 | 3.0 |
| 5 | 0.4 | 1.6 | Clear | 1.42 | 70 | 4.0 |
| 6 | 0.4 | 2.0 | Clear | 0.985 | 70 | 5.0 |
| 7 | 0.6 | 0 | Opaque White | >9999 | 70 | 0.0 |
| 8 | 0.6 | 0.6 | Opaque White | 8188 | 70 | 1.0 |
| 9 | 0.6 | 1.2 | Cloudy | 876 | 70 | 2.0 |
| 10 | 0.6 | 1.8 | Clear | 1.53 | 70 | 3.0 |
| 11 | 0.6 | 2.4 | Clear | 2.06 | 70 | 4.0 |
| 12 | 0.6 | 3.0 | Clear | 2.26 | 70 | 5.0 |
| 13 | 0.8 | 0 | Opaque White | >9999 | 70 | 0.0 |
| 14 | 0.8 | 0.8 | Opaque White | >9999 | 70 | 1.0 |
| 15 | 0.8 | 1.6 | Opaque White | 7347 | 70 | 2.0 |
| 16 | 0.8 | 2.4 | Clear | 2.41 | 70 | 3.0 |
| 17 | 0.8 | 3.2 | Clear | 2.97 | 70 | 4.0 |
| 18 | 0.8 | 4.0 | Clear | 3.11 | 70 | 5.0 |
| 19 | 1.0 | 0 | Opaque White | >9999 | 70 | 0.0 |
| 20 | 1.0 | 1 | Opaque White | >9999 | 70 | 1.0 |
| 21 | 1.0 | 2 | Opaque White | >9999 | 70 | 2.0 |
| 22 | 1.0 | 3 | Cloudy | 402 | 70 | 3.0 |
| 23 | 1.0 | 4 | Clear | 3.33 | 70 | 4.0 |
| 24 | 1.0 | 5.0 | Clear | 3.61 | 70 | 5.0 |
| 25 | 1.2 | 0 | Opaque White | 9729 | 70 | 0.0 |
| 26 | 1.2 | 1.2 | Opaque White | >9999 | 70 | 1.0 |
| 27 | 1.2 | 2.4 | Opaque White | >9999 | 70 | 2.0 |

TABLE 2-continued

| No | Reb D % | Stevioside % | Appearance | NTU | Temp (C.) | Stevioside:Reb D Ratio |
|---|---|---|---|---|---|---|
| 28 | 1.2 | 3.6 | Cloudy | 6785 | 70 | 3.0 |
| 29 | 1.2 | 4.8 | Clear | 4.12 | 70 | 4.0 |
| 30 | 1.2 | 6.0 | Clear | 4.86 | 70 | 5.0 |

This experiment showed that as the concentration of rebaudioside D increases, the ratio of stevioside to rebaudioside D required for complete dissolution also increases. For example, a 2:1 ratio of stevioside to rebaudioside D is required for dissolving a mixture containing 0.4% rebaudioside D, while a 4:1 ratio of stevioside to rebaudioside D is required for dissolving a mixture containing 1.0% rebaudioside D.

Example 8

Effect of Temperature of Solubility

Aqueous samples containing the amounts of rebaudioside D and stevioside listed in Table 3 were prepared by combining the noted amounts of rebaudioside D and stevioside in water. The samples were then warmed to the temperatures noted in the table.

The appearance of all the samples prepared as above was noted and turbidity measurements were taken to track solubility. The results are shown in Table 3.

TABLE 3

| No | Reb D % | Stevioside % | Appearance | NTU | Temperature (C.) |
|---|---|---|---|---|---|
| 31 | 0.04 | 0 | Clear | 0.438 | 70 |
| 32 | 0.1 | 0 | Clear | 0.606 | 70 |
| 33 | 0.2 | 0 | Clear | 0.517 | 70 |
| 34 | 0.3 | 0 | Clear | 0.523 | 70 |
| 35 | 1.5 | 6 | Clear | 4.82 | 70 |
| 36 | 2 | 8 | Cloudy | | 70 |
| 37 | 2 | 20 | Clear | 8.41 | 70 |
| 38 | 2.5 | 25 | Cloudy | | 70 |
| 39 | 2.5 | 30 | Clear | 21.8 | 70 |
| 40 | 3 | 36 | Opaque | >9999 | 70 |
| 41 | 0.04 | 0 | Clear | 1.12 | 20 |
| 42 | 0.1 | 0 | Cloudy | 1100 | 20 |
| 43 | 0.1 | 0.1 | Cloudy | 1208 | 20 |
| 44 | 0.1 | 0.2 | Cloudy | 1371 | 20 |

TABLE 3-continued

| No | Reb D % | Stevioside % | Appearance | NTU | Temperature (C.) |
|---|---|---|---|---|---|
| 45 | 0.1 | 0.3 | Cloudy | 3272 | 20 |
| 46 | 0.1 | 0.4 | Cloudy | 6128 | 20 |

Table 3 shows that both stevioside concentration and temperature affect rebaudioside D solubility. All four concentrations of rebaudioside D below 0.4 were dissolved at 70° C., but precipitated from solution when cooled unless stevioside was present. At a concentration of 0.1%, rebaudioside D is insoluble at 20° C. even up to a 4:1 ratio of stevioside to rebaudioside D. Also, as the rebaudioside D concentration increases above 1.2%, the ratio of stevioside to rebaudioside D required for complete dissolution increases. For example, a rebaudioside D concentration of 1.5% can completely dissolve at 70° C. when the concentration of stevioside is 6% (4:1 ratio of stevioside to rebaudioside D), while a rebaudioside D concentration of 2.5% can completely dissolve at 70° C. when the concentration of stevioside is 30% (12:1 ratio of stevioside to rebaudioside D). The solutions in Table 3 having a "clear" appearance remained clear upon cooling to room temperature.

Example 9

Impact of Additional Steviol Glycosides on Solubility of Compositions Containing Rebaudioside D and Stevioside Several samples containing rebaudioside D at a concentration of 0.4% and stevioside at a concentration of 2.0% were prepared at 70° C., each of which resulted in a clear solution. Varying concentrations of rebaudioside A, rebaudioside C, rebaudioside B, and rebaudioside M were then added individually to the stevioside/rebaudioside D solutions at 70° C. The solutions were allowed to cool to room temperature. Each sample's appearance was noted and turbidity measurements were taken to track solubility. The results are shown in Table 4.

TABLE 4

| No | Reb D % | Stevioside % | Reb A % | Reb C % | Reb B % | Reb M % | Appearance | NTU |
|---|---|---|---|---|---|---|---|---|
| 47 | 0.4 | 2.00 | 0.00 | 0.1 | 0 | 0 | Clear | 1.92 |
| 48 | 0.4 | 2.00 | 0.00 | 0.2 | 0 | 0 | Clear | 1.98 |
| 49 | 0.4 | 2.00 | 0.00 | 0.3 | 0 | 0 | Clear, but some small particles visible | 1.85 |
| 50 | 0.4 | 2.00 | 0.00 | 0.4 | 0 | 0 | Clear, but some small particles visible | 1.88 |
| 51 | 0.4 | 2.00 | 0.00 | 0 | 0.1 | 0 | Clear | 8.78 |
| 52 | 0.4 | 2.00 | 0.00 | 0 | 0.2 | 0 | Cloudy | 212 |
| 53 | 0.4 | 2.00 | 0.00 | 0 | 0.3 | 0 | Very Cloudy | 726 |
| 54 | 0.4 | 2.00 | 0.00 | 0 | 0.4 | 0 | Very Cloudy | 1568 |
| 54(1) | 0 | 0 | 0 | 0 | 0.2 | 0 | Very Cloudy | 5343 |
| 54(2) | 0 | 0 | 0 | 0 | 0.3 | 0 | Very Cloudy | 8615 |
| 54(3) | 0 | 0 | 0 | 0 | 0.4 | 0 | Very Cloudy | >9999 |

TABLE 4-continued

| No | Reb D % | Stevioside % | Reb A % | Reb C % | Reb B % | Reb M % | Appearance | NTU |
|---|---|---|---|---|---|---|---|---|
| 55 | 0.4 | 2.00 | 0.00 | 0 | 0 | 0.1 | Clear | 2.97 |
| 56 | 0.4 | 2.00 | 0.00 | 0 | 0 | 0.2 | Clear | 2.74 |
| 57 | 0.4 | 2.00 | 0.00 | 0 | 0 | 0.3 | Clear | 2.60 |
| 58 | 0.4 | 2.00 | 0.00 | 0 | 0 | 0.4 | Clear | 2.58 |
| 59 | 0.4 | 2.00 | 0.10 | 0 | 0 | 0 | Clear | 2.34 |
| 60 | 0.4 | 2.00 | 0.20 | 0 | 0 | 0 | Clear | 1.99 |
| 61 | 0.4 | 2.00 | 0.30 | 0 | 0 | 0 | Clear | 2.18 |
| 62 | 0.4 | 2.00 | 0.40 | 0 | 0 | 0 | Clear | 2.06 |
| 63 | 0 | 0.10 | 0.00 | 0 | 0 | 0 | Clear, but with large insoluble grains still visible after mixing for an hour at room temperature | 3.58 |

Table 4 shows that adding Rebaudioside A, C, or M at concentrations ranging from 0.1% to 0.4% to the stevioside/rebaudioside D solutions does not disrupt the rebaudioside D/stevioside complex and thus does not affect rebaudioside D's solubility.

Adding rebaudioside B at or over 0.2% resulted in a cloudy solution, however the cloudiness was believed to be due to rebaudioside B which was found to be insoluble at levels over 0.2%. To confirm that the cloudiness observed in samples comprising rebaudioside B was due to the rebaudioside B itself, a solution of stevioside and rebaudioside D was prepared and rebaudioside B was added at a concentration of 0.4% to form a cloudy suspension. The sample was centrifuged and filtered and the aqueous filtrate was analyzed by HPLC. Both the stevioside and the rebaudioside D were fully recovered in aqueous filtrate, however the filtrate only contained 65% of rebaudioside B initially added to the mixture. Thus, the cloudiness observed with the addition of rebaudioside B was due to the insolubility of rebaudioside B itself, and not due to the degradation of the rebaudioside D/stevioside complex.

Example 10

Impact of Steviol Glycosides on Rebaudioside D Solubility

A sample containing rebaudioside D at a concentration of 0.8% and stevioside at a concentration of 2.4% was prepared and heated to a temperature of 70° C. Similar samples containing rebaudioside D at a concentration of 0.8% and different individual steviol glycosides (rebaudioside A, rebaudioside B, rebaudioside M, and rebaudioside C) at concentrations of 2.4% were prepared and heated to a temperature of 70° C. Sample appearance was noted and turbidity measurements were taken to track solubility. The results are shown in Table 5.

TABLE 5

| No | Reb D % | Stevioside % | Reb A % | Reb B % | Reb M % | Reb C % | Temperature (C.) | Appearance | NTU |
|---|---|---|---|---|---|---|---|---|---|
| 64 | 0.8 | 2.4 | 0 | 0 | 0 | 0 | 70 | Clear | 2.48 |
| 65 | 0.8 | 0 | 2.4 | 0 | 0 | 0 | 70 | Cloudy | 84 |
| 66 | 0.8 | 0 | 0 | 2.4 | 0 | 0 | 70 | Opaque | >9999 |
| 67 | 0.8 | 0 | 0 | 0 | 2.4 | 0 | 70 | Opaque | >9999 |
| 68 | 0.8 | 0 | 0 | 0 | 0 | 2.4 | 70 | Opaque | >9999 |

The data in Table 5 indicates that only stevioside is able to complex with rebaudioside D to affect complete solubility at levels suitable for preparing concentrated beverage formulations.

Example 11

Solubility Studies for Spray Dried Powders and Manually Blended Steviol Glycoside Compositions Samples 69-72 in Table 6 were prepared by manually blending the noted ingredients and adding a sufficient amount of the resulting mixture to water at 25° C. to form a 1% solution.

By contrast, samples 73-76 were prepared in accordance with the procedures described in Example 9. The resulting solutions were then heated to between 80-99° C. and subsequently spray dried using a Buchi B-290 mini spray drier at a spray drying temperature of 200° C. and a flow rate of 10 milliliters per minute to form solid powders. The solid powders were then added to water at 25° C. in a sufficient amount to form a 1% solution.

The solubility of each sample and the actual temperature were noted. Turbidity measurements were taken to track solubility. The results are shown in Table 6.

TABLE 6

| No | Steviol Glycoside Blend | Solubility (1% at 25 C.) | Actual Temp. | NTU |
|---|---|---|---|---|
| 69 | RebD/stevioside (1:5) by manual blending | insoluble | 19.8 | 4053 |
| 70 | RebD/RebA/stevioside/(1:1:5) by manual blending | insoluble | 20.1 | 1281 |
| 71 | RebD/RebM/stevioside/(1:1:5) by manual blending | insoluble | 20.0 | 2804 |
| 72 | RebD/RebB/stevioside/(1:1:5) by manual blending | insoluble | 20.1 | 6833 |
| 73 | RebD/stevioside (1:5) by spray drying | soluble | 19.8 | 0.852 |
| 74 | RebD/RebA/stevioside/(1:1:5) by spray drying | soluble | 20.0 | 0.942 |
| 75 | RebD/RebM/stevioside/(1:1:5) by spray drying | soluble | 19.6 | 1.51 |
| 76 | RebD/RebB/stevioside/(1:1:5) by spray drying | soluble | 19.9 | 1.61 |

As is shown in Table 6, none of the manually blended mixtures were soluble. However, each mixture prepared according to the procedures described in Example 9 were soluble after spray drying. The data in Table 6 indicates that the improved solubility characteristics observed with a rebaudioside D/stevioside complex can be maintained even after a solution containing the complex is spray dried to form a powder.

Example 12

Sensory Evaluation Study

A sensory test was conducted to show that rebaudioside D improves the taste of stevioside. Aqueous samples containing the steviol glycosides listed in Table 7 were prepared as follows. Sample 77 was prepared by adding 400 mg stevioside to 1 L of a 0.1% aqueous citric acid buffer solution at 21° C.

Sample 78 was prepared by adding 600 mg rebaudioside D to 100 g of water. The resulting suspension was heated to 70° C. and 1.8 g stevioside was added. The mixture was stirred at 70° C. for about 15 minutes and then allowed to cool.

Samples 79-82 were prepared by adding the required amount of rebaudioside D to 100 g of water. The resulting suspension was heated to 70° C. and the required amount of stevioside was added. The mixture was stirred at 70° C. for about 15 minutes. The required amount of the additional steviol glycoside was added and the mixture was stirred at 70° C. for about 10 minutes and then allowed to cool.

Each sample was then diluted to 400 ppm of total steviol glycosides in a 0.1% aqueous citric acid buffer.

TABLE 7

| No | Reb D % | Stevioside % | Reb A % | Reb B % | Reb C % | Reb M % | Preparation Temperature (° C.) | Tasting Temperature (° C.) |
|---|---|---|---|---|---|---|---|---|
| 77 | 0 | 100 | 0 | 0 | 0 | 0 | 21 | 21 |
| 78 | 25 | 75 | 0 | 0 | 0 | 0 | 70 | 21 |
| 79 | 24.5 | 74.5 | 0.1 | 0 | 0 | 0 | 70 | 21 |
| 80 | 24.5 | 74.5 | 0 | 0.1 | 0 | 0 | 70 | 21 |
| 81 | 24.5 | 74.5 | 0 | 0 | 0.1 | 0 | 70 | 21 |
| 82 | 24.5 | 74.5 | 0 | 0 | 0 | 0.1 | 70 | 21 |

Nine expert tasters were then asked to evaluate and compare sample sweetness and flavor profiles. For each sample, the tasters were presented with a control (sample 1 in Table 7) and one coded sample (one of samples 2-6 in Table 7) at room temperature. The tasters were then asked to taste the control, rinse their palate with water, and then taste the coded sample. The tasters were then asked to compare the coded sample to the control and rate bitterness and sweet intensity on a scale from +5 to −5, where a positive score indicated a higher bitterness or sweet intensity and a negative score indicated lower intensity. The tasters were allowed to re-taste multiple times and were required to cleanse their palate with water between each tasting. The same process was repeated with the remaining samples. The results for each sample for bitterness and sweet intensity were averaged and graphed in FIG. 4.

Figure 4:
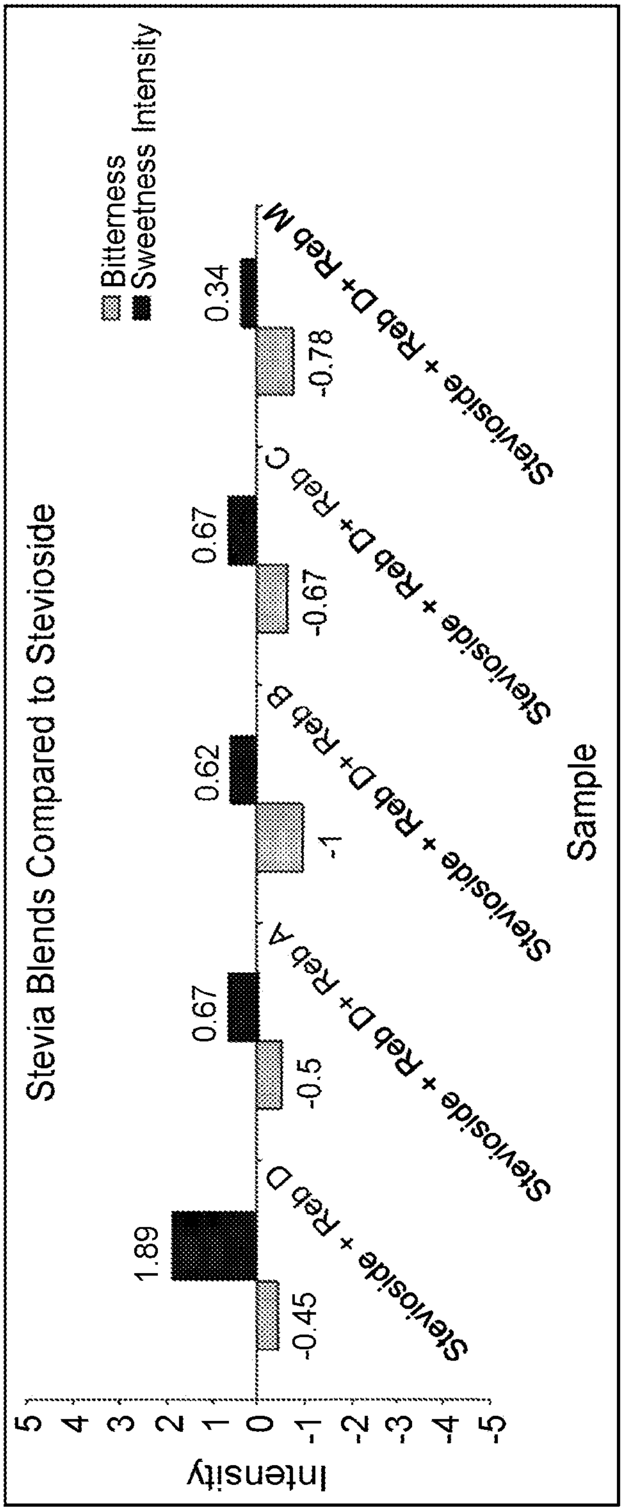
FIG. 4 is a bar graph showing rebaudioside D's effectiveness at improving the taste profile of stevioside.

As shown in FIG. 4, samples containing rebaudioside D exhibited decreased bitterness and increased sweetness intensity compared to stevioside alone. Samples containing rebaudioside D, stevioside, and another steviol glycosides also showed reduced bitterness compared to stevioside alone.

Example 13

Sensory Evaluation Study

A first sample containing a 4:1 ratio of stevioside/rebaudioside A to rebaudioside D by weight, was prepared by adding and mixing 80 mg of rebaudioside D, 96 mg of stevioside, and 224 mg of rebaudioside A in water at 70° C., subsequently cooling the resulting solution to room temperature, and then diluting an appropriate amount of solution in pH 3 citric acid buffer to 400 ppm total steviol glycosides (320 ppm stevioside/rebaudioside A and 80 ppm rebaudioside D). A second sample was prepared by adding a sufficient amount of rebaudioside A to water and diluting to a 400 ppm solution in pH 3 citric acid buffer.

Eight expert tasters were presented with water to rinse and cleanse their palate prior to tasting each sample. The tasters were presented with two coded samples at room temperature and asked to taste one coded sample, rinse their palate with water, and then taste the other coded sample. The tasters were asked to compare each sample based on sweet intensity, bitterness, sweet linger, and sugar quality and were asked to identify their preferred sample for each characteristic. Tasters were allowed to re-taste multiple times and were required to cleanse their palate with water between each tasting. The results are shown in FIG. 5.

Figure 5:
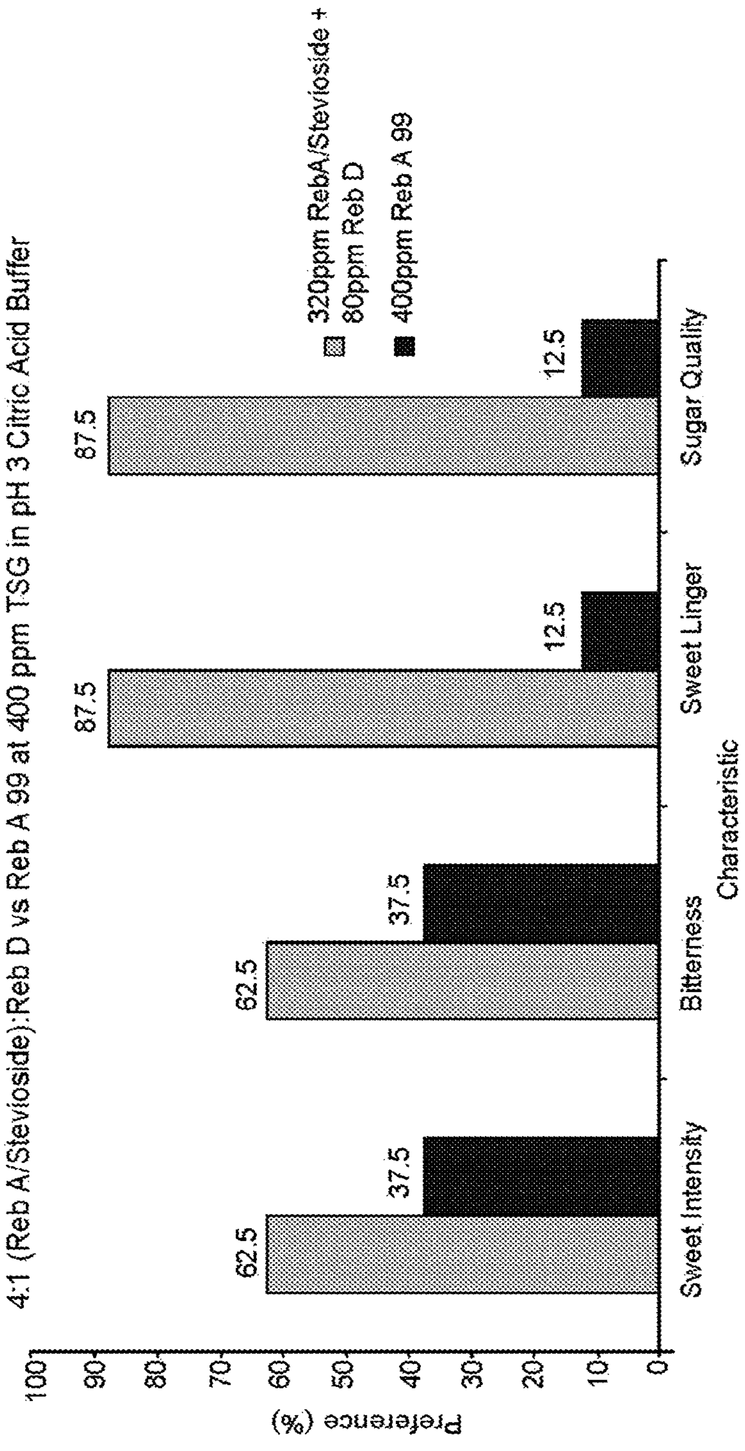
FIG. 5 is a bar graph showing the differences in sweet intensity, bitterness, sweet linger, and sugar quality between a steviol glycoside composition comprising stevioside and rebaudioside D and a composition containing rebaudioside A as the only steviol glycoside.

As shown in FIG. 5, 62.5% of tasters preferred the stevioside-rebaudioside D sample's sweet intensity and lack of bitterness compared to 400 ppm rebaudioside A sample, and 87.5% of tasters preferred the stevioside-rebaudioside D sample's sweet linger and sugar quality to the 400 ppm rebaudioside A sample.

These experiments surprisingly show that even though stevioside is generally considered to have an undesirable flavor profile, stevioside's unfavorable characteristics can be masked and/or suppressed by complexing it with rebaudioside D. This is especially surprising given the 4:1 ratio of stevioside to rebaudioside D and that stevioside is typically discarded as a byproduct of steviol glycoside isolation.

Example 14

Comparison of Spray Dried Powder and Manually Blended Composition Containing Rebaudioside D and Stevioside One sample containing rebaudioside D at a concentration of 0.4% and stevioside at a concentration of 2.0% was prepared at 70° C. in accordance with the procedures described in Example 9. The sample was then spray dried in accordance with the procedures described in Example 11. A second sample was prepared by manually blending solid stevioside and solid rebaudioside D in a 5:1 ratio by weight, respectively. The two samples were analyzed by Fourier-Transform Infrared (FTIR) spectrometry. The resulting spectra are shown in FIG. 6.

Figure 6:
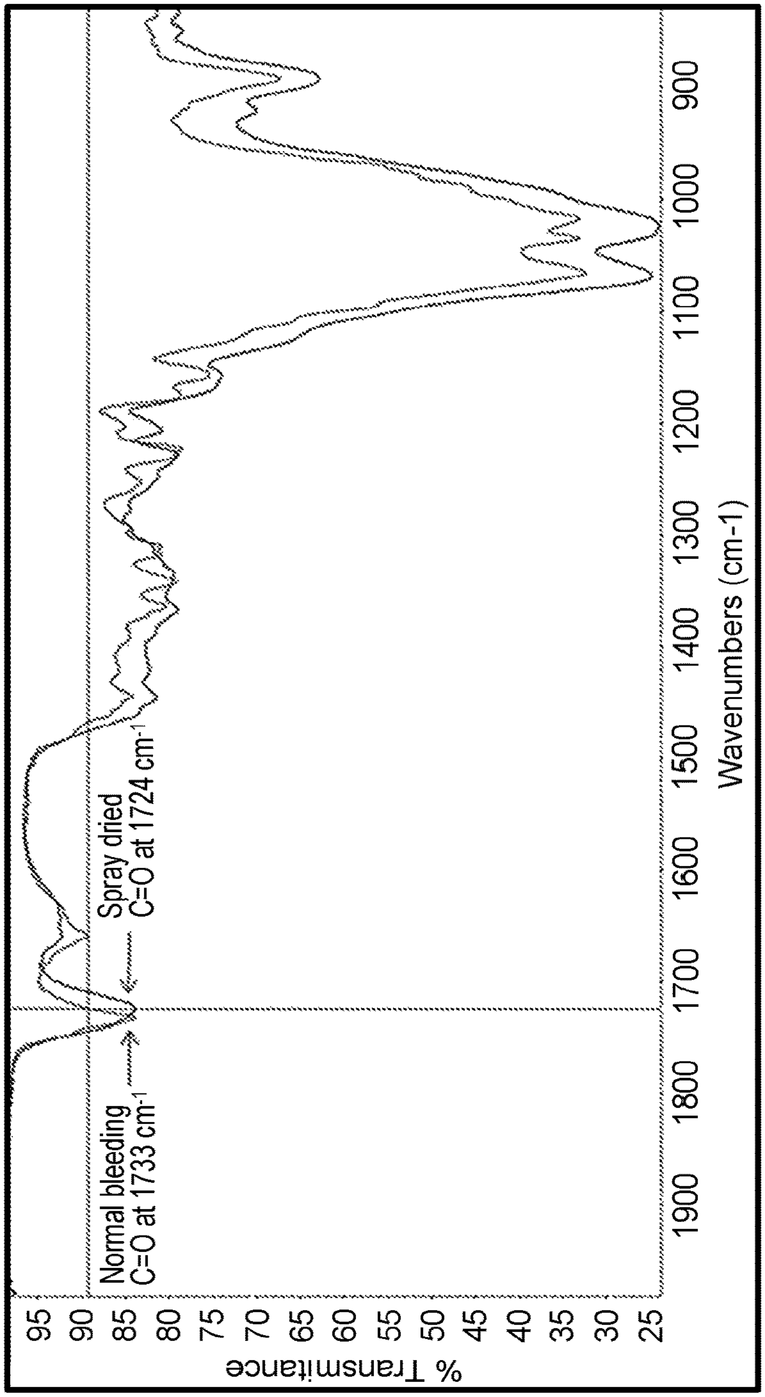
FIG. 6 is an FTIR spectrum showing the differences between a rebaudioside D and stevioside complex and uncomplexed rebaudioside D and stevioside.

FIG. 6 shows that a change in absorption for a carbonyl group in either stevioside or rebaudioside D occurred in the spray dried sample as compared to the manually blended sample. The data shows that an environment around the carbonyl in stevioside or rebaudioside D changed within the stevioside-rebaudioside D complex in the spray dried sample, but not within the stevioside and rebaudioside D in the manually blended sample. Such a change in the environment indicates that physical bonds formed between stevioside and rebaudioside D in the spray dried sample.

The samples prepared as noted above were each dissolved in water to a concentration of 500 ppm. The resulting solutions were analyzed using a pendant drop tensiometer (Teclis Inc.) to evaluate and quantify each solution's surface activity. To determine the surface activity, 4 μL of air was released into each solution forming a bubble. A camera then measured the changes in bubble volume every 0.75 seconds from time zero when the drop was created up to 2 hours. The results are shown in FIG. 7.

Figure 7:
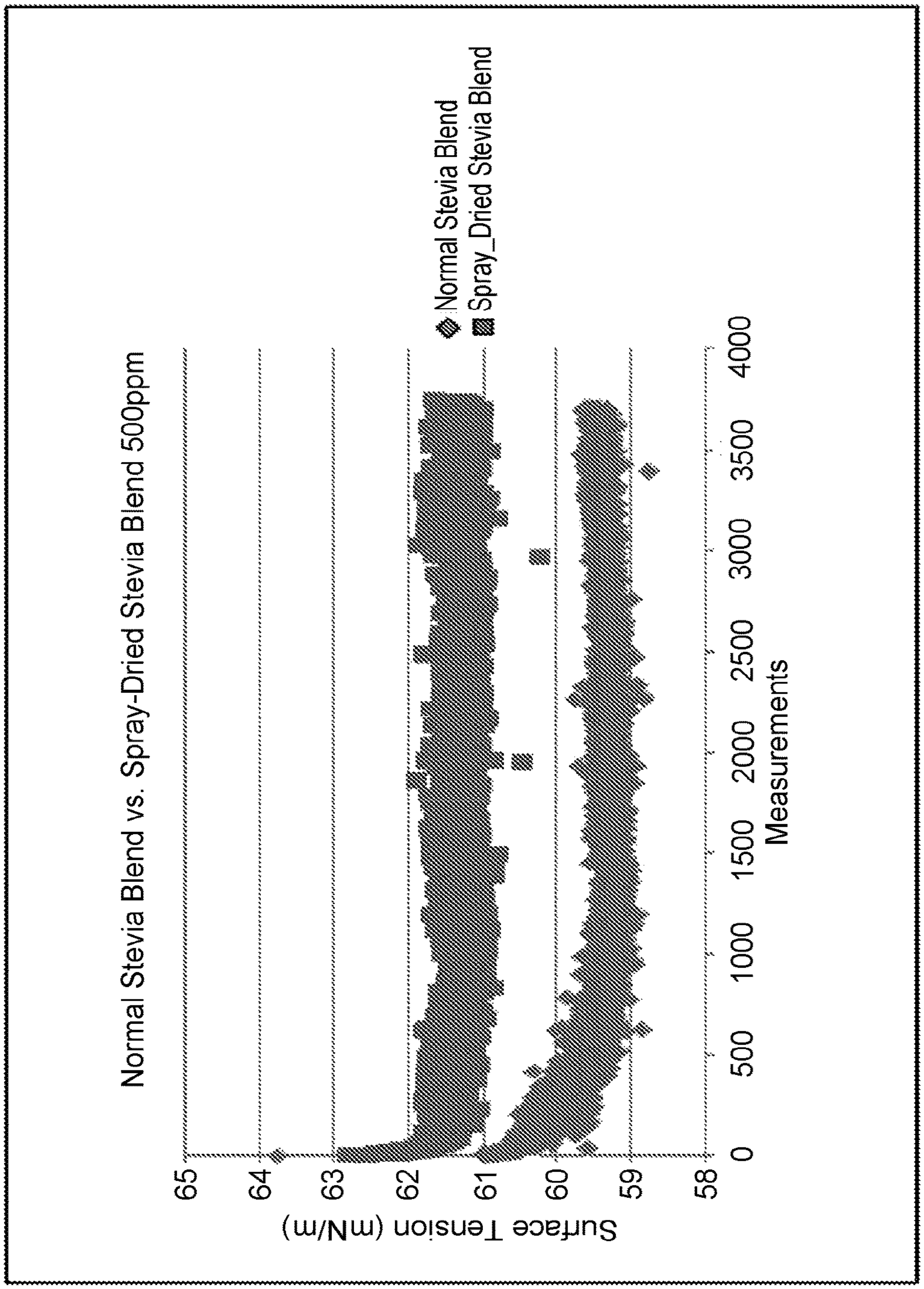
FIG. 7 is a surface activity graph showing the differences between a spray dried composition containing rebaudioside D and stevioside and a manually blended composition containing rebaudioside D and stevioside.

FIG. 7 shows a significant difference in surface activity between the solution comprising the spray dried sample and the solution comprising the manually blended sample. The difference in surface activity indicates that, upon dilution in water, the stevioside-rebaudioside D complex in the spray dried sample remained intact, thus altering the glycosides' surface activity as compared to the manually blended sample where no complexation occurred.

Example 15

Comparison of Stevioside and a Stevioside/Rebaudioside D Complexes Via $^{13}C$ NMR Three samples were prepared for analysis via 13C NMR: a 500 ppm stevioside control sample in deuterated water ($D_2O$); a 500 ppm stevioside/rebaudioside D (5:1 w/w) complex sample in $D_2O$; and a 500 ppm stevioside/rebaudioside D (1:1 w/w) complex sample in $D_2O$. The 5:1 and 1:1 stevioside:rebaudioside D complexes were prepared according to the procedures described in Examples 9 and 11.

The three samples were analyzed by $^{13}C$ NMR at 150 MHz at 24° C. using an Agilent® DD2 600 MHz NMR instrument. The first sample containing only stevioside was analyzed twice by $C^{13}$ NMR over 2 days to establish method variability. The results showed that the deviation of chemical shift for same sample run on different days was less than 0.1 ppm, indicating high stability for the NMR instrument. Each of the complexes was then analyzed by $^{13}C$ NMR under the same conditions as the stevioside control.

Figure 8:
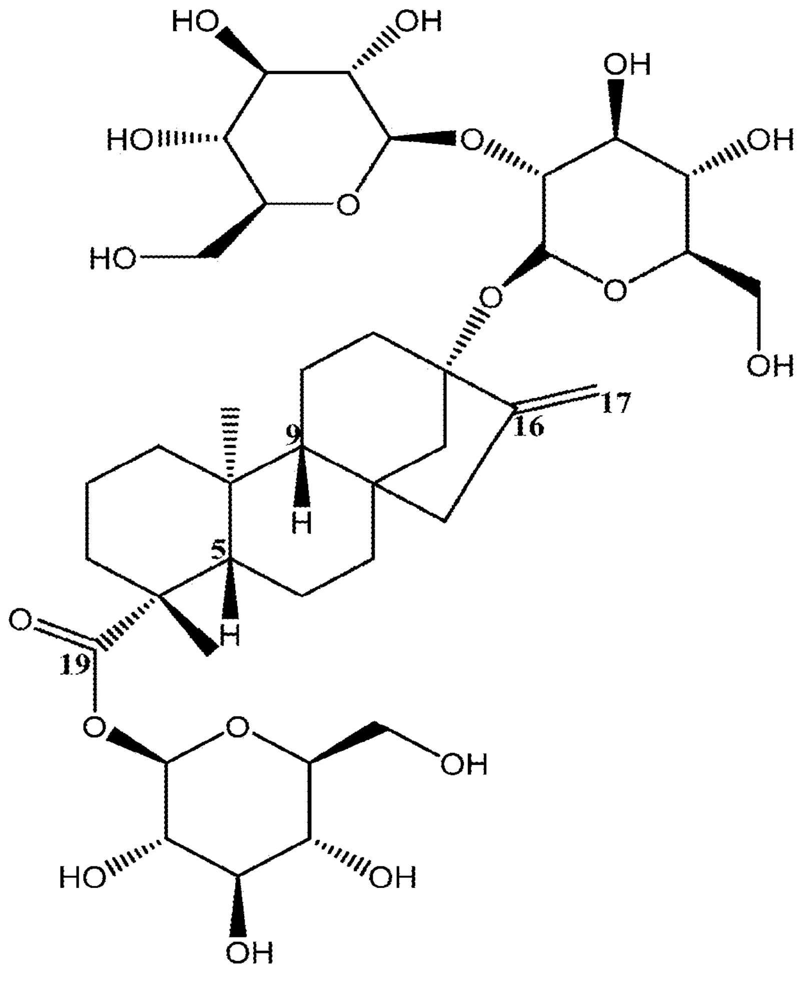
FIG. 8 shows the chemical structure of stevioside with carbons 5, 9, 16, 17, and 19 labeled.
Figure 9:
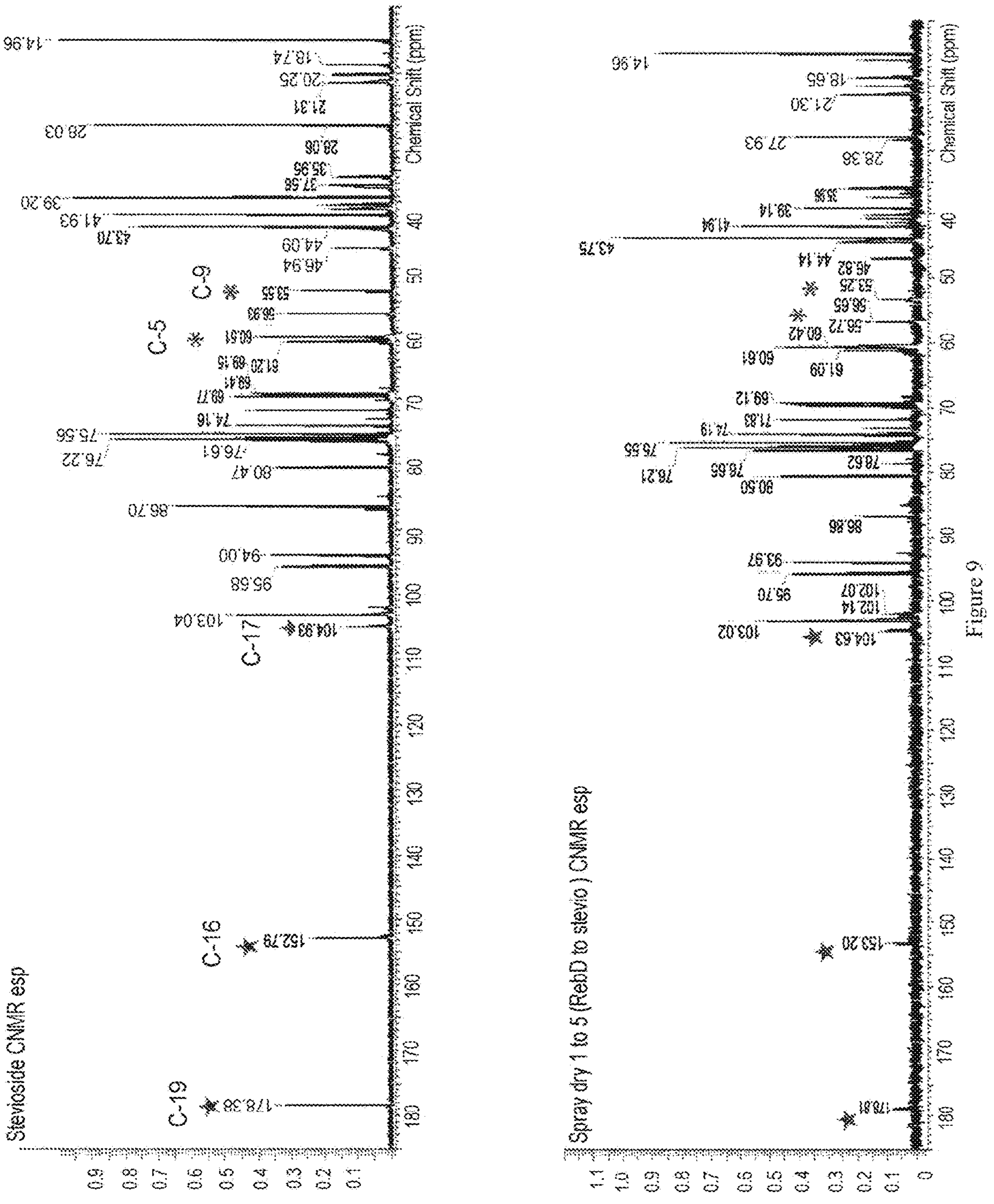
FIG. 9 depicts a comparison between the $^{13}C$ NMR spectra of stevioside and a 5:1 (w/w) stevioside:rebaudioside D complex.
Figure 10:
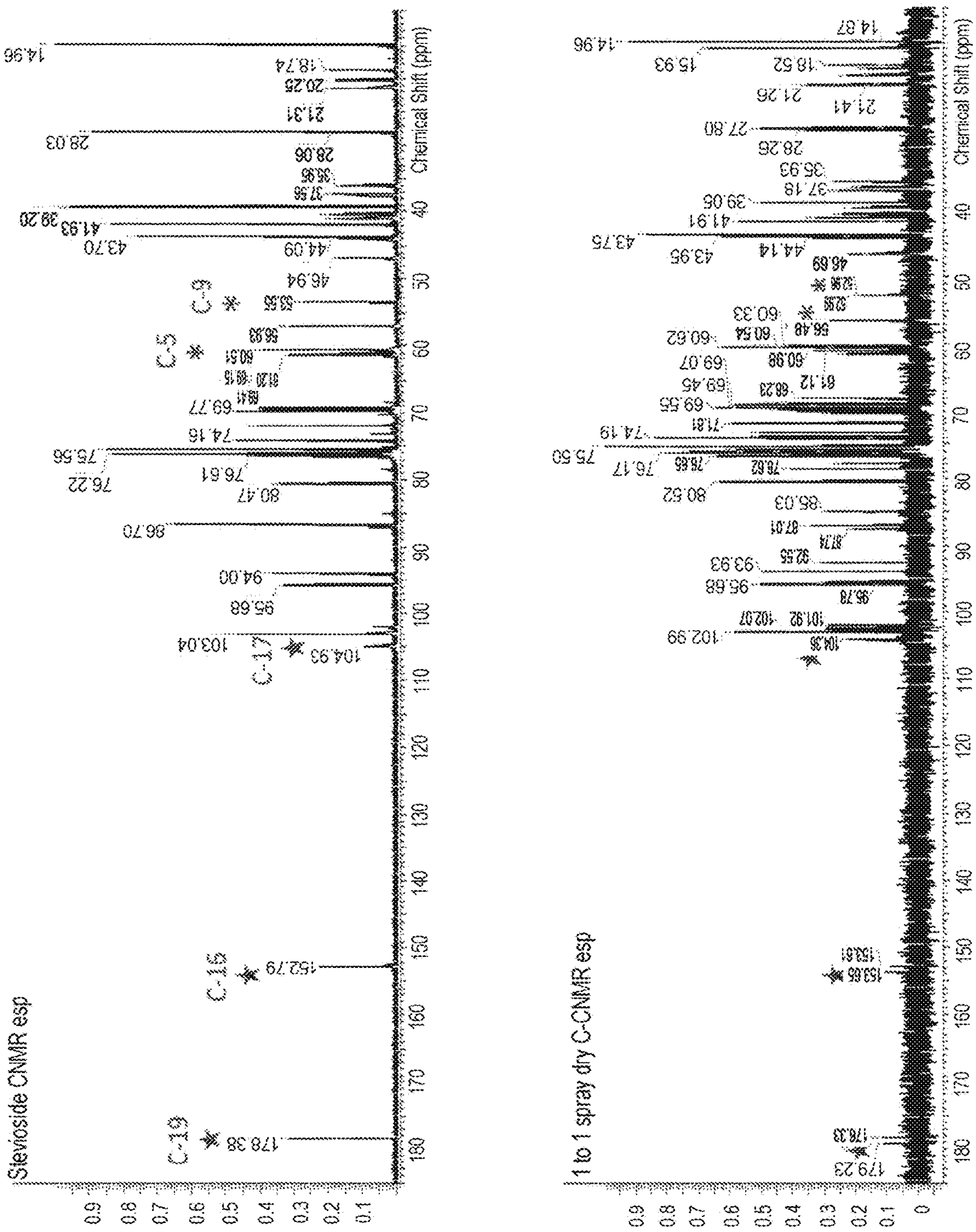
FIG. 10 depicts a comparison between the $^{13}C$ NMR spectra of stevioside and a 1:1 (w/w) stevioside:rebaudioside D complex.

The resulting spectra are compared in FIGS. 9 and 10 and show that complexing stevioside with rebaudioside D results in significant differences in chemical shifts and peak intensities for stevioside's carbons 5, 9, 16, 17, and 19. Stevioside's carbons are labeled in FIG. 8. The chemical shifts for stevioside's carbons 5, 9, 16, 17, and 19 for each sample are shown in Table 8.

TABLE 8

| Carbon Position | Sample 1 Stevioside Chemical Shift in ppm | Sample 2 5:1 Stevioside to Rebaudioside D Chemical Shift in ppm (change from Sample 1) | Sample 3 1:1 Stevioside to Rebaudioside D Chemical Shift in ppm (change from Sample 1) |
|---|---|---|---|
| Carbon 5 | 56.97 | 56.72 (−0.2) | 56.5 (−0.4) |
| Carbon 9 | 53.58 | 53.25 (−0.3) | 53.0 (−0.6) |
| Carbon 16 | 152.83 | 153.2 (+0.4) | 153.6 (+0.8) |
| Carbon 17 | 104.96 | 104.63 (−0.3) | 104.30 (−0.7) |
| Carbon 19 | 178.4 | 178.8 (+0.4) | 179.3 (+0.9) |

The differences in chemical shift and peak intensity for stevioside's specified carbons indicates complex formation between stevioside and rebaudioside D.

While this disclosure mentions specific examples and embodiments, those skilled in the art will appreciate that there are numerous variations and modifications within the spirit and scope of the disclosure as set forth in the appended claims.

What is claimed is:

1. An aqueous steviol glycoside composition comprising:
water;
a stevioside/rebaudioside D complex; and
at least one additional steviol glycoside selected from the group consisting of rebaudioside A, rebaudioside B, rebaudioside C, and rebaudioside M.

2. The aqueous steviol glycoside composition of claim 1, wherein the at least one additional steviol glycoside is rebaudioside A.

3. The aqueous steviol glycoside composition of claim 2, wherein the stevioside and rebaudioside A are present in a ratio of 20:1 to 1:99.

4. The aqueous steviol glycoside composition of claim 2, wherein the stevioside and rebaudioside A are present in a ratio of from less than 95:5 to 1:99 by weight.

5. The aqueous steviol glycoside composition of claim 2, wherein the stevioside and rebaudioside A are present in a ratio of from about 1:1 to about 2:98 by weight.

6. The aqueous steviol glycoside composition of claim 1, wherein the at least one additional steviol glycoside is rebaudioside C.

7. The aqueous steviol glycoside composition of claim 6, wherein the stevioside and rebaudioside C are present in a ratio of 20:1 to 1:99.

8. The aqueous steviol glycoside composition of claim 7, wherein the stevioside and rebaudioside Care present in a ratio of from less than 95:5 to 1:99 by weight.

9. The aqueous steviol glycoside composition of claim 8, wherein the stevioside and rebaudioside C are present in a ratio of from about 1:1 to about 2:98 by weight.

10. The aqueous steviol glycoside composition of claim 1, wherein the at least one additional steviol glycoside is rebaudioside M.

11. The aqueous steviol glycoside composition of claim 6, wherein the stevioside and rebaudioside M are present in a ratio of 20:1 to 1:99.

12. The aqueous steviol glycoside composition of claim 7, wherein the stevioside and rebaudioside M are present in a ratio of from less than 95:5 to 1:99 by weight.

13. The aqueous steviol glycoside composition of claim 8, wherein the stevioside and rebaudioside M are present in a ratio of from about 1:1 to about 2:98 by weight.

14. The aqueous steviol glycoside composition of claim 1, wherein the at least one additional steviol glycoside is rebaudioside B.

15. The aqueous steviol glycoside composition of claim 6, wherein the stevioside and rebaudioside B are present in a ratio of from 20:1 to 8:1 by weight.

16. The aqueous steviol glycoside composition of claim 7, wherein the stevioside and rebaudioside B are present in a ratio of from less than 95:5 to 8:1 by weight.

17. A syrup comprising the aqueous steviol glycoside composition of claim 1.

18. A beverage comprising the aqueous steviol glycoside composition of claim 1.

* * * * *